(12) United States Patent
Chiluvuri

(10) Patent No.: US 7,840,937 B1
(45) Date of Patent: Nov. 23, 2010

(54) BUILDING SOFTWARE COMPONENTS

(75) Inventor: Raju V. Chiluvuri, Hyderabad (IN)

(73) Assignee: Raju Chiluvuri, Hyderabad, AP (IN)

( * ) Notice: Subject to any disclaimer, the term of this patent is extended or adjusted under 35 U.S.C. 154(b) by 1117 days.

(21) Appl. No.: 11/465,511

(22) Filed: Aug. 18, 2006

Related U.S. Application Data

(62) Division of application No. 10/951,066, filed on Sep. 27, 2004.

(60) Provisional application No. 60/544,212, filed on Feb. 12, 2004, provisional application No. 60/744,508, filed on Apr. 9, 2006.

(51) Int. Cl.
*G06F 9/44* (2006.01)

(52) U.S. Cl. .................... 717/106; 717/107; 717/108; 717/109

(58) Field of Classification Search ................ 717/106
See application file for complete search history.

(56) References Cited

U.S. PATENT DOCUMENTS

| 7,346,899 B2 * | 3/2008 | Ebro et al. .................... 717/144 |
| 7,363,612 B2 * | 4/2008 | Satuloori et al. ............ 717/107 |
| 2002/0108099 A1 * | 8/2002 | Paclat ......................... 717/102 |
| 2004/0015832 A1 * | 1/2004 | Stapp et al. ................. 717/106 |
| 2004/0111701 A1 * | 6/2004 | Beust .......................... 717/108 |
| 2005/0155016 A1 * | 7/2005 | Bender ........................ 717/106 |

* cited by examiner

*Primary Examiner*—Thomas K Pham

(57) ABSTRACT

The present invention discloses a process of using a container code generator to generate a web application. By using the process, the container component coder generator uses at least one component code generator for a subcomponent to generate the component code of the subcomponent, includes the component code of the subcomponent in the web application, and generates necessary communication code that allows the subcomponent to communicate with the container component or another subcomponent inside the container component at a client computer.

38 Claims, 19 Drawing Sheets

Resultant Application Components

Portfolio at the end of 2dn Quarter

- Sun
- Microsoft
- IBM
- Intel
- Oracle

Sun 14%
Microsoft 17%
IBM 20%
Intel 23%
Oracle 26%

TODAY
Wind: NNE 18mph
High
76° F
Mostly Sunny
Percip: 0%

TONIGHT
Wind: NNE 9mph
Low
59° F
Mostly Clear
Percip: 0%

500
516
518

Simple JSP Pseudo-Code

```
<svg height="750" width="500">
//===Global Objects can be defined here ===
//====CCG1: Code for Pie Chart ====
<g transform="translate(0,0)">
<%
// Instantiate & Initialize the CCG for Portifolio
AgileTemplate portfolio_pie_chart
    = new PortfolioCF (ACI, user_account_number);
// This writes AC1's code to the "out" stream.
portfolio_pie_chart.CGM(out);
%>
</g>
//===CCG2: Code for Weather forecast===
<!-- Translate (X, Y) sets the X & Y location. -->
<g transform="translate(0,250)">
<%
// Instantiate & Initialize CCG for Weather Forecast
AgileTemplate WeatherForecast
    = new BriefWeatherForecast (ACI, zip_code);
// Call CGM method to include AC2's Code here.
WeatherForecast.CGM(out);
%>
</g>
</svg>
```

FIG. 5

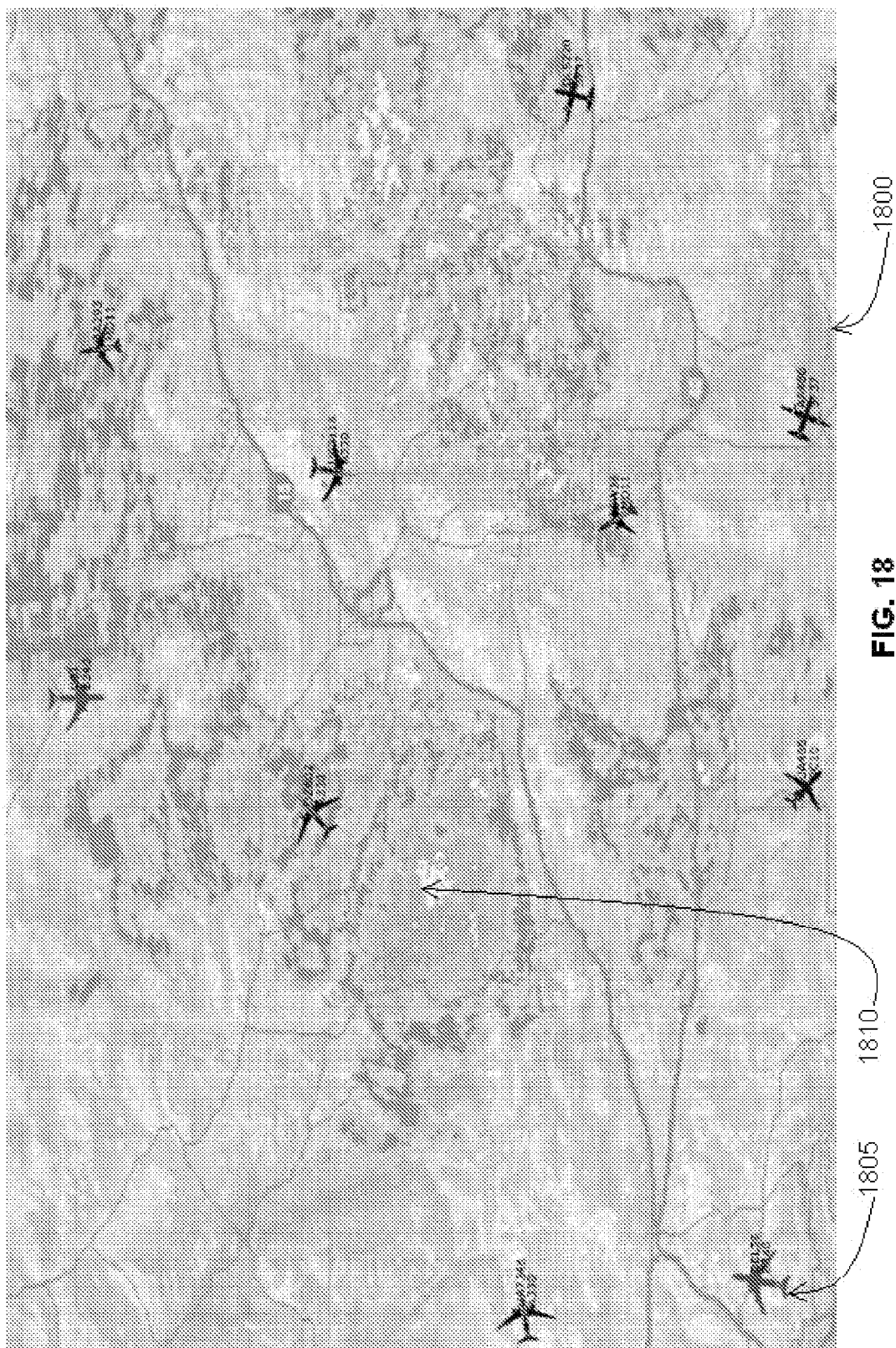

BUILDING SOFTWARE COMPONENTS

CROSS-REFERENCE TO RELATED APPLICATIONS

This application is a Divisional patent application from Ser. No. 10/951,066, filed Sep. 27, 2004 now still pending, which claims priority from Provisional Patent Application Ser. No. 60/544,212, filed Feb. 12, 2004, and the entire contents of all of the patent applications are hereby incorporated herein by reference. This patent application also claims the priority from the Provisional Patent Application Ser. 60/744,508, filed Apr. 9, 2006, the contents of which are incorporated herein by reference in the entirety.

REFERENCE TO COMPUTER PROGRAM LISTING, COMPACT DISC APPENDIX

This patent application includes a compact disc containing program listing in the ASCII uncompressed text format with ASCII carriage return, ASCII line feed and all control codes defined in ASCII, having computer compatibility with IBM PC/XT/AT or compatibles, having operating system compatibility with MS-Windows. The contents of the compact disc are incorporated herein by reference in its entirety. The compact disc is created on Aug. 16, 2006 and includes the following files and sizes:

1. AC_Info_java.txt (5,177 bytes), class source code in Java;
2. AgileTemplate_java.txt (5,627 byte), class source code in Java;
3. Airline_class_js.txt (5,776 bytes), application code in JavaScript;
4. AirlinerCF_java.txt (3,859 bytes) class source code in Java;
5. Airplane_java.txt (13,328 bytes), class source code in Java;
6. Airplane_svg.txt (5,309 bytes), Application code in SVG;
7. AppConfigInfo_java.txt (4,140 bytes), class source code in Java;
8. ATC_CF_java.txt (10,369 bytes), class source code in Java;
9. atc_example_jsp.txt (2,866 bytes), source code in JSP;
10. directory_obj_js.txt (1,726 bytes), application code in JavaScript;
11. flight2_example_jsp.txt (4,597 bytes), source code in JSP;
12. flight_example_jsp.txt (3,295 bytes), source code in JSP;
13. get_info_jsp.txt (6,117 bytes), source code in JSP;
14. get_loc_jsp.txt (1,461 bytes), source code in JSP;
15. info_table_jsp.txt (7,027 bytes), source code in JSP (include file);
16. RadioButtons_java.txt (6,051 bytes), class source code in Java;
17. RadioButtons_svg.txt (4,179 bytes), application code in SVG;
18. rb_rb_example_jsp.txt (2,120 bytes), source code in JSP;
19. Readme.txt (2,134 bytes), document about the test platform in text;
20. RotateBanner_java.txt (7,061 bytes), class source code in Java;
21. RotateBanner_svg.txt (6,816 bytes), application code in SVG;
22. subcomponents_jsp.txt (4,604 bytes), source code in JSP (include file);
23. UniqStrId_java.txt (2,438 bytes), class source code of in Java; and
24. Webservices_class_js.txt (6,095 bytes), application code in JavaScript.

COPYRIGHT NOTICE AND USE PERMISSION

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever. The following notice applies to the software and data as described below and in the drawings hereto: Copyright 2006, Raju Chiluvuri, All Rights Reserved.

FIELD OF THE INVENTION

This invention relates to application development, and particularly to software development method for generating platform-compatible code of web components.

BACKGROUND OF THE INVENTION

Online applications are now routinely used to conduct business transactions. Online applications with easy-to-understand graphic user interface can increase the efficiency of communication between the companies and the users or customers, and reduce chance of making mistake. By using online applications, companies are able to increase business productivity, reduce business expenses, and save staff time. Companies use online applications to (1) conduct modeling and simulation, (2) distribute company information to employees, their customers, investors, and the general public, (3) control their systems from a remote client, (4) monitor internal or external data such as market trend critical to their business success, (5) manage their database systems or data warehouse, and (6) deliver customer services such as bank account access, issuing of Return Material Authorization number, product registration, and survey of customer satisfaction.

A web page is generated by a server and rendered in a client computer connected to the server using a communication protocol such as HTTP or FTP. The client computer running a browser with a unique IP address first sends a request through Internet or private network to the server, requesting a web page. The request contains the URL of the web page and browser-specific information. The server then passes the URL and the browser-specific information to the JSP/Servlet or CGI in the server as parameters, generates the web page for the client computer, and sends the web page to the client computer for rendering.

Web pages can be generated dynamically because the JSP/Servlet can get data from an external source at the time of creating the web page. Nowadays, store inventories, merchandize prices, customer contacts, the data on weather conditions for a city, and company stock prices may be kept in database servers such as Content Management Systems ("CMS"), RDBMS or Sequel severs which are housed in workstation, mainframe computer or computer clusters. Those servers can also be housed in the same computers hosting the web servers. If those database servers are in different computers, the web server computers can connect to the database computers by Internet or private network to retrieve the latest information. If a web page is to show the stock price of a company, and if the stock price of the company is maintained within the same computer, the JSP/Servlet can get the latest stock price for the company when it generates the web page. If the stock price is maintained in a different computer, the JSP/Servlet can get the latest stock price from that computer by network connection.

Moreover, a web page often comprises plural graphic components, non-graphic component, and even embedded video components. The web page may include associated files such as image files, JavaScript files, and video files by reference even though those files may be stored in different locations. These components collaborate with each other in action and/or communicate with each other in a way comparable to the GUI application on desktop computers. Online application is better term for referring to dynamic web pages.

Online application and all of the components may be coded in any XML graphic languages such as Microsoft's XAML, X3D, W3C's SVG, XHTML/DHTML, Adobe's MXML/Flash, and JavaScript code. The code listings of a web page may be placed in different locations as long as they are properly referenced by the component. Detailed code statements for rendering a given graphic component depends upon its platform, which is defined by machine hardware, operating system, and browser. The specific code statements for a shopping cart and shopping items running in an Apple computer are different from those running in an Intel Machine. Some platforms may require that XML instructions be translated (e.g. Adobe's MXML to Flash) or compiled (e.g. Microsoft's XAML to executable) into an executable program before the application can run under the platform.

It is hard to write bare XML instructions for data-driven large custom graphic components. When an online application has many components, the components may need to interact with each other and exchange data among them during execution. Therefore, it is even harder to create graphics-intensive online applications that contain many graphic components that can interact with each other intelligently.

Large online applications often comprise many software components that need to be updated (e.g. redesigned to implement more functionality or features) as Internet technologies evolve, and business needs change.

An attempt to reduce programming burden is revealed in the commercial distribution of special Java class libraries. The libraries comprise a collection of component code generators ("CCG") for GUI components, which are of Java class, respectively for popular graphic components such as charts, trees, menus and graphs. One GUI CCG is designed for each commonly known graphic component. For example, one GUI class is implemented for Pie chart and another GUI Class is implemented for Line chart. All CCGs are coded in a language supported in the web server, and can run in the server like any java program. For instance, when a CCG for a pie chart is instantiated and initialized, the object generates the code for a pie chart, which may be rendered under an appropriate platform such as DHTML, SVG or Adobe's Flash. Before the CCG object is called to generate the code, the object may be customized based on user preferences and initialized with the newest application data obtained from database maintained in the server computer or from an external data source. Therefore, relative percentages in the pie chart will reflect the latest information of interest.

While CCGs are commercially available there is no workable mechanism to properly assemble plural CCGs to form a proper container CCG for generating a functional component. An application often needs two or more components. If two components X and Y do not need to collaborate with each other and do not exchange data, it is possible to generate the two components by calling two CCGs in sequence. However, if component X needs to call component Y upon an event such as user's click on mouse, time expiration, and change of value or state, it would be necessary to manually add some code statements to establish necessary collaboration. Likewise, if component X needs to use data from component Y, addition of code and modification of existing code is necessary.

The extra code statements must be added and the modification of existing code statements must be made before the rendering of the online application. Conceptually, the only way of developing a workable online application would be to collect the application code for both component and then adding necessary code and modifying the existing code. This may create a different problem. Since the component code showing graphic image may carry the real time information in the image itself, a delay in sending out the application code to the client computer may reduce the value of the information. It is harder to modify the values used in the graphic image according to the latest database value manually. Moreover, if plural components with different levels of hierarchy are built manually, it would be difficult and time-consuming. Moreover, this also requires more storage space for complex applications.

Due to the difficulty described above, companies often spend more money on maintaining online applications than building/acquiring their first releases. Despite the spending, the results are often unsatisfactory, and the applications often end up in degraded code structure. If Object Oriented Programming ("OOP") is used to build the application, each CCG that generates large component's code usually uses many objects.

In reality, it is required that online application is updated quickly to meet the evolving business needs. It is usually error-prone in part due to the nature of work and in part because the developers are under time constraints to update the application. It takes considerable effort to remove a large container component, and the developers need to understand the internal design and code dependencies between different objects within the code of component's CCG, the distribution of the code sections of the objects among many files, and the interactions between the objects.

Therefore, there is a need for finding a better method to build components using CCGs more efficiently. There is a need for a simple process in the server for generating application code for subcomponents and for adding additional application code that allows the subcomponents to interact and communicate with each other and with the container component. It is desirable to have a mechanism to use a container component as a subcomponent in another larger container component or to allow the container component to interact and communicate with the larger component in the online application.

SUMMARY OF THE INVENTION

The present invention is component based software development system and a process for dynamically generating web document or the application code of the online application for an appropriate platform. A container component in a web application may have at least one component (thus, it is a subcomponent with respect to the container component), which can be generated by a component code generator ("CCG") at sever. The CCG of the subcomponent implements a special method referred to as "Code-Generation Method" ("CGM"). When this method is called, it generates complete and functional component code for itself. The CCG also implements (a) special methods, upon being called, returns the names of the service methods of the class object implemented in the application code of the subcomponent and/or (b) special methods to input the names of methods that are implemented out side the application code of the subcomponent and to be called from the application code of the subcomponent.

The CCG for the container component ("container CCG") is coded by incorporating one or more CCGs for subcomponents, where each of the CCG objects is incorporated by (a) inputting its reference using input methods of the container CCG or (b) instantiating it inside the container CCG. The container CCG also has a few lines of special code, known as server integration code responsible for generating what is known as "communication code", whose function is to allow the subcomponent to communicate with the container component and allow the subcomponents to communicate with each other.

When this container CCG is run in sever, the process for generating a complete and functional application code for the container component include:

(a) using CCG objects to dynamically generate application code for the subcomponents, (b) assembling the code of the subcomponents in the application, (c) using the special function in the subcomponent CCG to get the names of the service methods of the subcomponent in the application code; (d) adding communication code by using the names of the service methods of the subcomponent in the application code.

The communication code is added in the application code so that (1) a subcomponent can exchange data with other subcomponents inside the container component or with the container component, (2) a subcomponent can call and use the service methods of other subcomponents or the service methods of the container component, and (3) the container component can call the service method of any of the subcomponents. When an application component can perform one or more of those functions as required by the development objective, it is complete and fully functional.

The components in the application interact or communicate with each other through predefined interfaces. For example, if one component calls service method of other component, the communication interface is defined by the function to be called and the parameters of the function (i.e. number of parameters, type and data format of the parameters). Each component in the application interacts with other components in the application using their predefined interfaces. If a container CCG uses other CCGs for generating subcomponents, the container component interacts with each of the subcomponents using the predefined interfaces of the subcomponent. Likewise, the subcomponents interact with the container component or other subcomponents using their interfaces.

It is preferable that only code inside the container CCG uses the special methods of the CCG for subcomponents to create the communication code. Code outside of the container CCG must not use the special methods of the CCGs for the subcomponents to create communication between the subcomponent and an outside component. If one of the subcomponents needs a service of an outside component, the container component must interact with the outside component to get the service for the subcomponent. Therefore, developers of CCGs for other components needs to pay no attention to the internal working of the container component or its CCG. This allows a larger container CCG to use the CCG of the original container component for generating one of its subcomponents and the new larger container CCG only need to directly interact with the CCG for original container component. The CCG of new larger container component generates application code for a larger container component that has the original container component as a subcomponent. This process may be repeated to generate code for larger and larger container components.

A CCG for a container component may be designed to further comprise:

(i) One or more methods for generating component code that reflects the input-data and is compatible with the browser to which the application is sent; and (ii) Code statements to implement business logic of the component. This portion of code is responsible for getting necessary data from database or internal data sources and conducting necessary computation required by and consistent with business transactions, business policies, customization/preference, and access security.

The CCG of a container component may comprise subcomponent CCGs for generating the application code of the subcomponents. Likewise, the CCG of the container component may comprise subcomponent CCGs for generating elementary GUI components such as charts, menus, lists and maps. For the same reason stated for CCGs, any functional CCG has only its own interface for interacting with other CCGs and may be used as a subcomponent CCG for generating complete and fully functional subcomponent. The CCG may further comprise the code for instantiating and initializing the subcomponent CCGs or CCGs for GUI elements. The application code generated by the container CCG comprises container component's services, and:

(1) The code generated by the subcomponent CCG objects or subcomponent GUI-objects;

(2) Necessary code for properly placing the subcomponents in the proper locations on the display screen together with proper attributes such as hide, show and animation; and (3) Necessary communication code so that the container component and subcomponents are able to use each other's service methods and exchange data during execution.

The solution embodied in the present invention is to implement simple predefined interfaces in the container component of a container CCG, allowing its subcomponents to communicate and collaborate with other subcomponents, and allowing one subcomponent to use the service of other subcomponents or the container component. By using the predefined interfaces, the subcomponents can be removed, replaced, and refined more easily.

The software development method of the present invention can reduce the programming coding labor because it partitions a complex component into smaller subcomponents, and developers are able to build CCG for each of the subcomponents independently. This method naturally reduces the overall degree of the complexity and allows developers to focus on the component that they have core competence.

Application developers create CCG, which generates the application code for component. Therefore, the CCG needs to be redesigned for updating the functionality, features and communication interfaces of the component.

This software development method of the present invention uses a global approach for integrating components. The developer of a component relies on the interfaces of other components that are used as subcomponents, to build the component. The developers of the subcomponent are free to improve the development process, improve code structure, refine functionality of the subcomponents, and improve the performance of the subcomponents independently as long as the compatibility of the interfaces of the subcomponents with the component is maintained. If this component is used by another larger component, the developer of this component is also free to improve this component as long as the compatibility of the interface of this component with the larger component is maintained.

Additional features and advantages of the invention will be apparent by reading the following detailed description of the invention and the accompanying drawings.

BRIEF DESCRIPTION OF THE DRAWINGS

FIG. 5 shows simple JSP pseudo-code and the resultant component as viewed on computer screen, according to one embodiment;

FIG. 18 shows a basic weather map background for an air traffic control system, according to one embodiment.

DETAILED DESCRIPTION OF THE INVENTION

I. Terms and their Definitions

Figure 1:
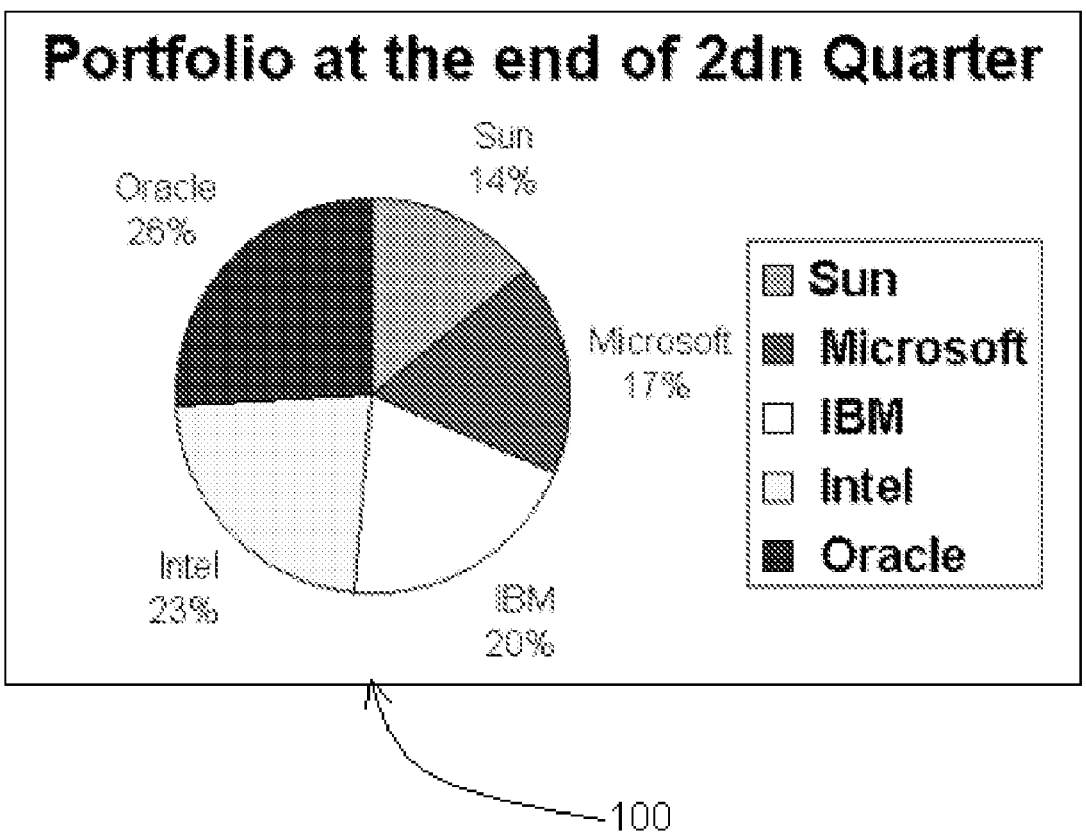
FIG. 1 shows an application component's screen image for showing stock portfolio, according to one embodiment.

"Application component" is a collection of code, which represents a cohesive object or component instance after it is initialized or generated. It is also web component.

"Online-GUI-API" is a library of Java classes for various presentation components such as charts, lists, rotate-components and menus. Each of online-GUI-API classes can generate SVG/JavaScript code to graphically present respective component. For convenience, online-GUI-API classes and Java classes may mean the code implementing their respective classes.

"Code of the Application Component" is a block of code to present an application component or component in the web page or under a viewer. The code of the application components may contain instructions in various presentation markup languages such as XHTML, SVG X3D, SMIL, CSS and DOM, script languages such as JavaScript and VBscript, and variable declarations. The code may comprise the code to present the component, and code of service methods, event handlers which would be responsive to user events, data arrival and state change, and methods that facilitate external code to register callbacks that is notified on given event. The component code may also comprise code for communicating with the server to get or send data and to refresh or update the component by using an appropriate URL to contact and communicate with the server. The code may also include external objects by reference. An example for the external object is a file that contains a GIF image, XML or JavaScript. In this disclosure, GUI class module and CCG can be used to generate the code of application component.

"Component Code Generator" (CCG) is a computer program built for a component in any suitable language. Upon execution, the CCG generates presentation code to present the component for a suitable platform. The pre-build GUI classes are a type of CCG classes, which are designed for reuse by developers. These GUI classes or pre-build CCG classes do not contain server code in application logic to access data from a data source. Instead, the GUI classes comprise set-methods for inputting data at run-time. Examples of this type of CCGs include GUI class modules that generate GUI components such as charts or dials. A CCG is generally referenced with respect to a component or subcomponent. Whether a CCG is for a container or a subcomponent depends upon its relation to other components. A CCG for a container component becomes a CCG for a subcomponent if the CCG is used by another larger CCG to generate application code of the subcomponent in its component.

"Communication code" (which is referred as integration code in the parent application) is a few lines of special code that allow two or more subcomponents inside a container component to communicate with each other and collaborate with each other. Throughout the disclosure, communication code also includes the necessary code allowing a container component (or any part of it) to interact with the subcomponents that are incorporated in the container component.

"Server Integration Code" means a portion of the server code inside a CCG that is responsible for generating a few lines of communication code that allow the subcomponents to interact with each other and with the container and exchange data with each other and with the container. When a CCG for a container component, which contains one or more CCGs for subcomponents, is called to generate the application code, the resultant subcomponents will not be able to interact and exchange data with each other under the browser. Therefore, it is necessary for the server to create and add the communication code inside the application code of the container component.

II. The Basic Idea

Figure 2:
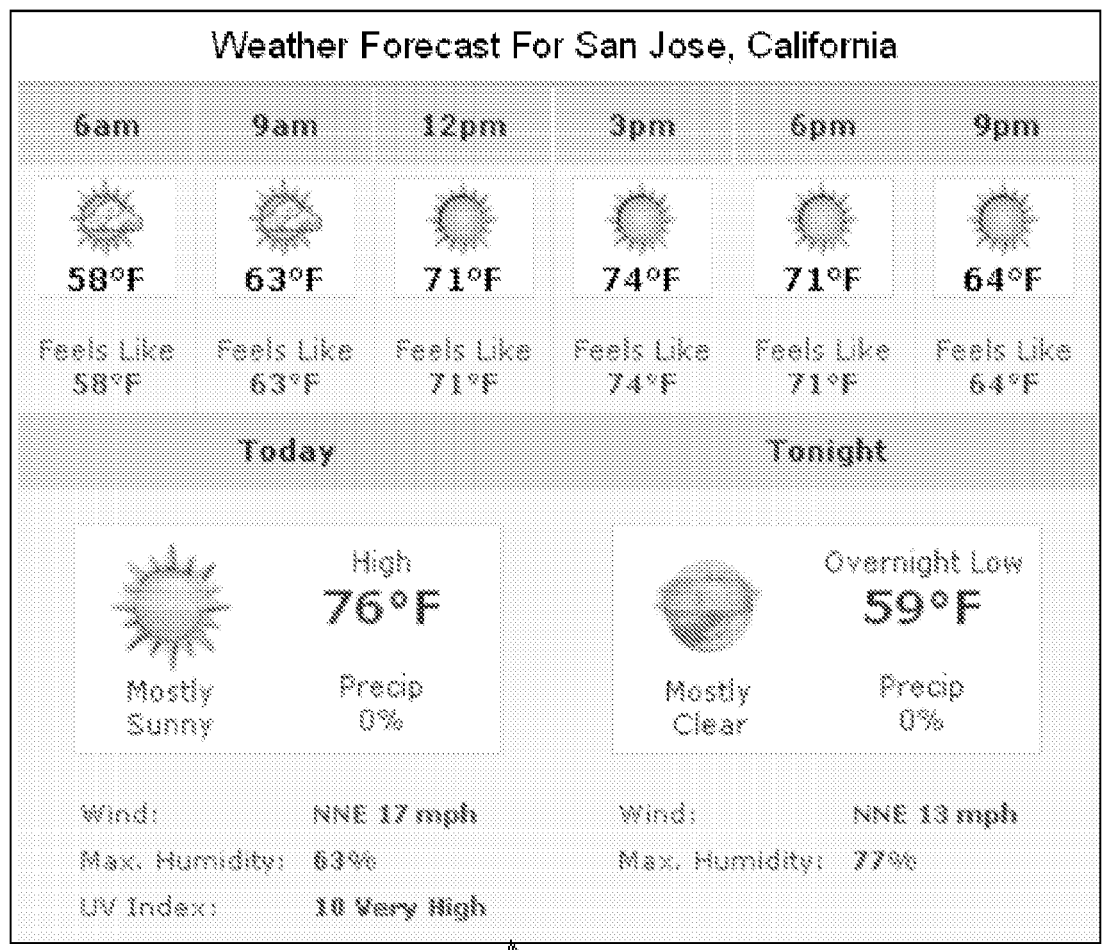
FIG. 2 shows an application component's screen view for weather information for a locality, according to one embodiment.

An online application mainly consists of one or more web pages or windows that are displayed on computer screen to deliver information. Each web page consists of one or more web components. A web component is also an application component. Complicated online application may comprise many components that interact or communicate with each other. Common web components include data-collecting forms, common charts, trees and maps. Two example web components, a pie chart for stock portfolio and a weather information chart, are shown in FIGS. 1 and 2.

Figure 3:
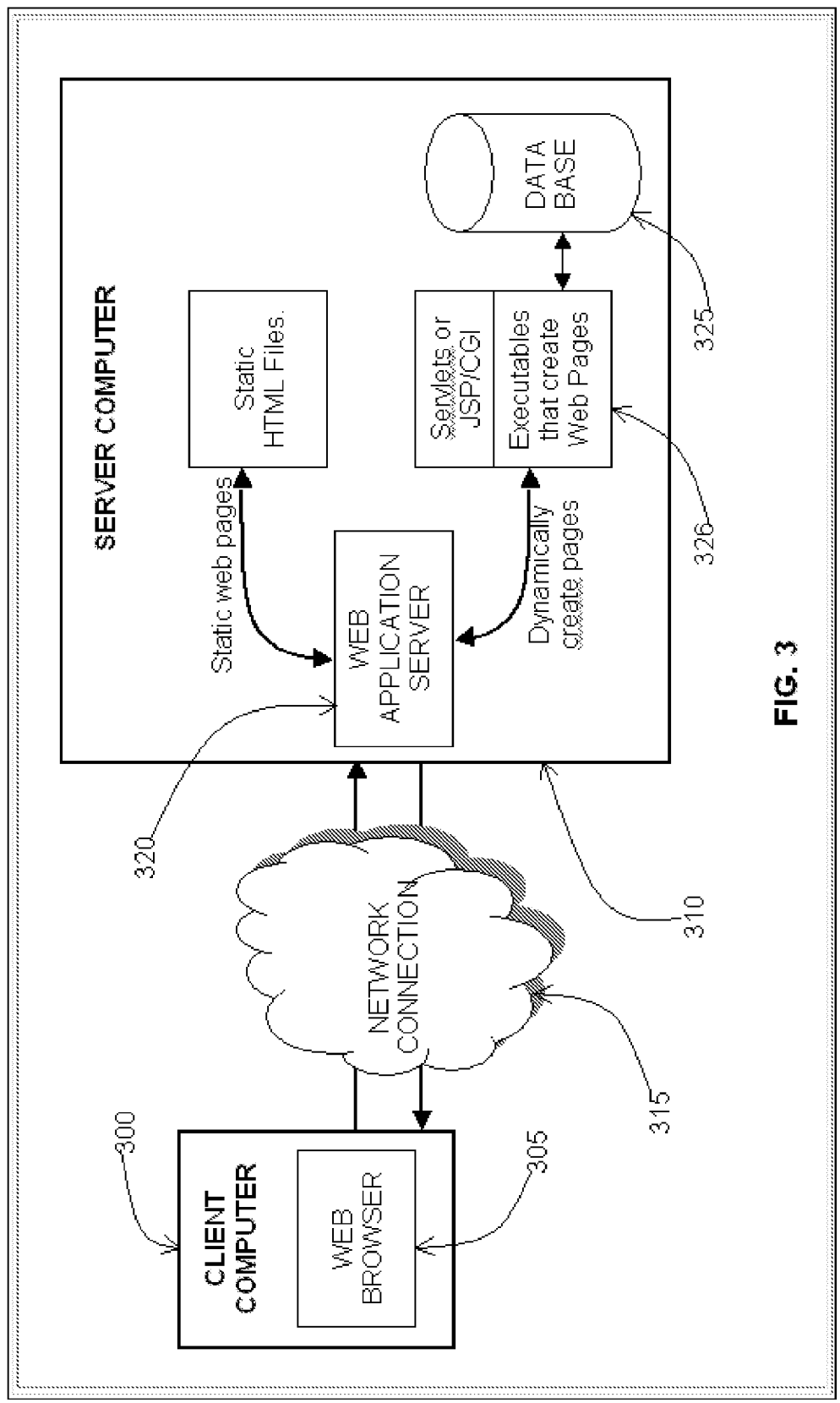
FIG. 3 shows the system for implementing the method of the software development, according to one embodiment.

A typical online application system is shown in FIG. 3. The system comprises a client computer 300 running an operating system (not shown) and a web browser 305, a server computer 310, and a network connection 315 between the client computer 300 and the server computer 310 so that the client computer 300 and the server computer 310 can exchange data according to an Internet communication protocol such as Hypertext Transfer Protocol (HTTP) or File Transfer Protocol (FTP). The server computer 310 hosts a web application server 320, which runs Servlet or JSP and/or has a Common Getaway Interface (CGI) 326. The server computer 310 may optionally run a database server 325 or similar data base application. The web browser 305 uses a URL (the virtual address of the server) to locate the web application server 320 and to request a web page. If the URL points to a static web page, the server computer 310 returns the page in appropriate code. If the URL points to an executable (CGI or JSP/ASP), the request will cause the server computer 310 to run the executable, which creates a web page dynamically.

Two layers of program code run the software development system. Software developers design and write the server program, which, upon being run at the server, generates the code of the application component and sends it to the browser for rendering. To increase efficiency and reduce development time, the developer of a component code generator can incorporate a suitable pre-built GUI class module for generating the application code for the graphic element of the component as shown in the following example.

The following code shows how a CCG uses online GUI class module for a pie chart to generate SVG code for the pie chart:

1. Double val[ ]={10000, 12000, 14000, 16000, 18000};
2. String names[ ]={"Sun", "Microsoft", "IBM", "Intel", "Oracle"};
3. ATPie Pie1=new ATPie(ACI, "Portfolio at the end of 2nd Quarter");
4. Pie1.setData(5, val, names);
5. Pie1.CGM(out);

The data variables val[ ] in the above listing is assigned with five values and names[ ] are assigned with names of five companies. ATPie is a Java class for presenting a pie chart. At line 3, a class object, Pie1, is instantiated using the title string "Portfolio at the end of 2nd Quarter" and "ACI". In line 4, the class method, setData( ) is called to set data values used by the pie object using the values of val[ ] and names[ ]. At line 5, the program writes SVG code for the pie chart to the 'out' stream. 'ACI' is an object, which may contain additional information about the user such as preferences and authentication and information about the browser such as type and version. The 'ACI' (in Appendix file AC_Info_java.txt) object is passed to all CCG Objects of the container, and the CCG of all subcomponents; and, therefore, the information contained in the object is available to all methods inside the container CCG and the CCG of subcomponents.

When the CCG executes code at line 5, it generates a pie chart. The code block is in SVG/DOM/JavaScript. This code comprises of SVG instructions to render the pie chart. The val[ ] and names[ ] may be initialized at run time and assigned with values of calculation result or the data obtained from databases. Additional functions for retrieving external data, calculating using the retrieved data, and customizing the component may be placed after line 2 and before line 4.

Figure 4:
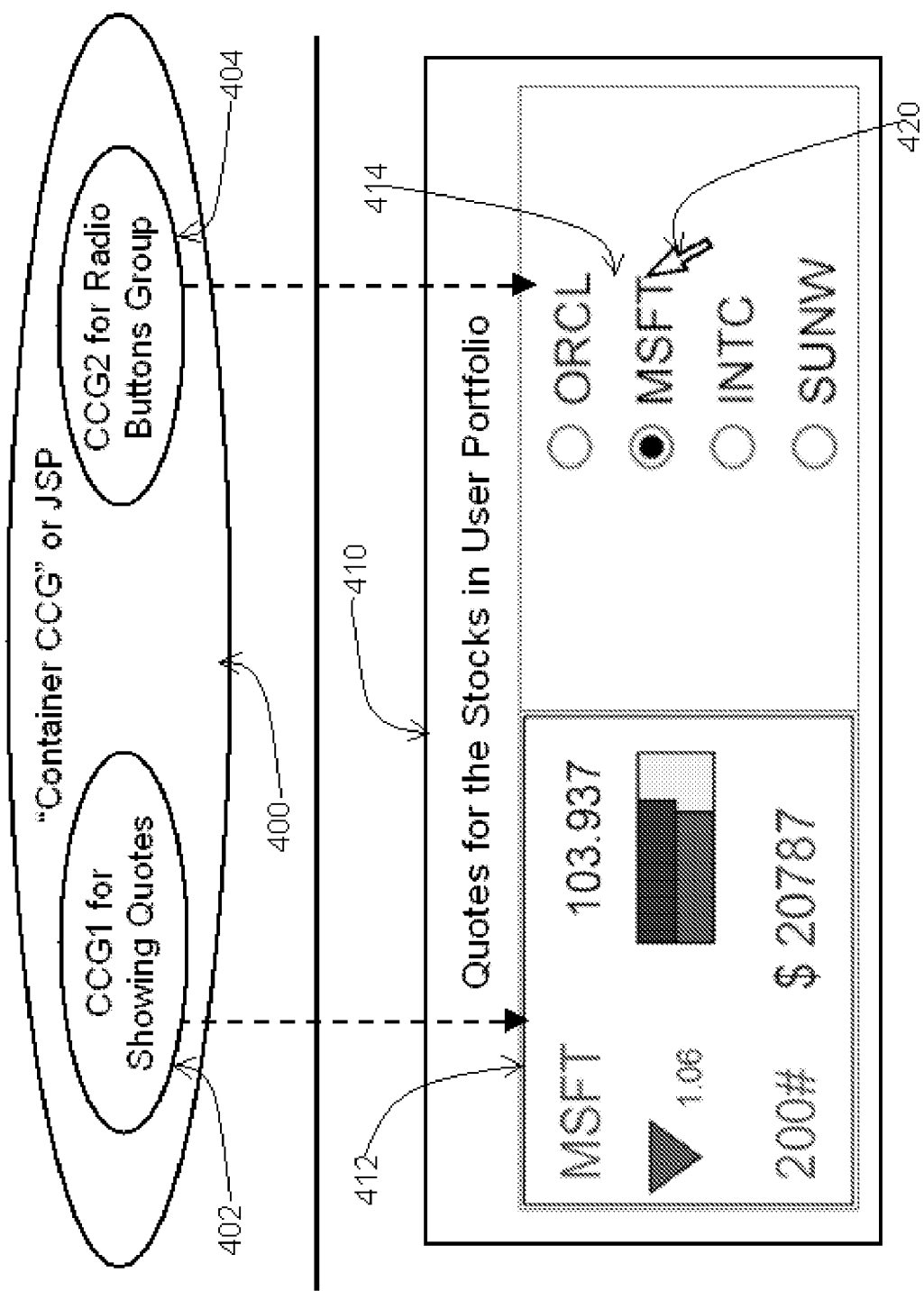
FIG. 4 shows two CCGs creating two components in the application where no communication code is created for them to collaborate with each other, according to one embodiment.

By using a CCG together with GUI class libraries, the developer can avoid coding a great deal of code for creating the image. Unfortunately, this simple method is capable of creating components that do not interact or exchange data with other components in the application (or web page). In computer screen, the viewer will see images such as a stock quote and buttons, but they cannot communicate with each other. If a developer creates Portfolio stock quote component (FIG. 4) and radio buttons just by calling respective GUI class modules 402 and 404 in sequence, what the developer will get is a static stock quote component 412 and radio button 414. But if user selects a new radio button in the group 414, the radio button group cannot call a method of stock quote component 412 to update itself to show stock quote for the newly selected ticker. If the user of this application wants to see the stock performance information for any of the four companies by clicking on the area or the button 414 corresponding to the company, the developer must design the CCG 400 with a proper code which will let the sever to add a few line of communication code in the code for the application 410 so that the two components can collaborate and communicate with each other.

One way to add communication code is to collect the application code of two components in a file and then manually add necessary communication code in the file. This file is made available for rendering. This turns the web page into a static page. Each time a component is created in run time, the latest stock information is passed into the parameters that define image attributes such as stock quote and change in price. To re-run the CCG 400 again, the CCG creates an up-to-date image 410, once again, without communication code.

The present invention discloses a method for generating communication code, which can be used by subcomponents to collaborate and communicate with each other in application. The method is implemented by adding what is known as the server integration code in the container CCG. In the alternative, a directory method may be used to perform the same function. The details are discussed in Section titled "Using directory services method".

The container CCG is preferably implemented in Java class derived from an abstract base class AgileTemplate.java (in Appendix file AgileTemplate_java.txt), which comprises an abstract code-generating method (CGM). Also AgileTemplate.java optionally may comprise objects and methods that are generally useful to the CCGs. For example, this preferred implementation has objects UNQ_ID and "ACI". A CGM of a CCG for container component is implemented so that it is able to generate complete and fully functional code for the container component. If the container CCG uses the CCGs of subcomponents, the CGM of the container CCG also calls the respective CGMs of the subcomponent CCGs to generate the application code of the subcomponents. In addition, the container CCG also generates the remaining code for the container component, including communication code and the remaining container component code. Because the CGM of the container CCG is able to generate complete and functional code for the component, the CCG, in the form of instantiated and initialized object, can be used by a larger CCG to generate the code for the component inside the large component.

The process for generating fully functional application component using two CCGs respectively for subcomponents AC1 516 and AC2 518 is shown in FIG. 5. When the CCG is run, it instantiates and initializes CCG1, and calls the CGM of the CCG1 to generate code for subcomponent AC1. It then instantiates and initializes CCG2 and calls the CGM of the CCG2 to generate code for subcomponent AC2, It then generates all necessary communication code for AC1 and AC2. It finally generates the remaining code for the container component.

This software development paradigm has inherent limitations. If a component has two subcomponents A and B, and if A interacts with B only through subcomponent B's interface to request a service of B, the developers of the subcomponents A and B can freely change the code of subcomponents A and B as long as the compatibility of their interface is not affected. The compatibility of the interface is defined by function name, number of parameters, and the data format of the parameters. It is not required that each of the attributes in the interface be exact. Subcomponent B may be coded to tolerate a certain degree of departure from the ideal interface. Moreover, some interface data may be filled by default values as long as they do not affect the nature of the business transaction emulated or modeled. However, if a change to A's interface is made beyond the scope subcomponent B can tolerate, the developer of the subcomponent B must update B before subcomponent B can continue to properly interact with subcomponent A. Generally, when the interface of a component is changed, the developers of all other components that use the interface of the component need to know the change in advance.

III. The Steps of Developing Component-Based Software

A. Identify Application Components

While the types of application components vary from application to application and may be unique in a given application, it is straightforward to identify application components after the purpose and requirements of the application is finalized. A developer needs to decide the proper scope of each component before he can build respective CCG for component. Some examples are shown in the following:

1. A customer relationship management application ("CRM") may solicit from customer complaints or satisfaction surveys. One of the methods for collecting such information is to present a table for the user to enter information. When the user enters the data, the CRM then displays the result by a chart or graph to show the result.

2. In an air traffic control system, each airplane may be represented using an application component in the map.

3. In a visual simulation application, each of the perceivable physical items or human characters that are simulated may be represented by an application component.

B. Partition the Component into Plural Simpler Subcomponents.

The next step is to partition the component into one or more simpler subcomponents, which may be built independently. The developers of the component specify the desired functionality and features for each of the subcomponents. The developers of subcomponents build each of them independently. Some subcomponents may use standardized interfaces. However, the functionality and interfaces need to be pre-defined for custom subcomponents. The developers of subcomponents must build the subcomponents to satisfy the custom functionality and interface requirements. Each of the subcomponents may be built independently.

C. Application Code of Basic Graphic Components

According to the present invention, a CCG is used to generate application code for a component, which incorporates or uses one or more basic GUI components as subcomponents. The ultimate objective of designing the CCG is that it has all necessary server code for generating application component that has all intended features and functionality. Each of the basic GUI components included in the application code of the container component normally contains (a) class definitions, (b) object instantiation and initialization sections, and (c) XML graphic elements definitions.

The class definitions comprises a JavaScript class (or C# class in case of XAML) that comprises definitions of a set of service functions, which may be called to operate the component, update the component, and request services of the component. The class code may have the methods to register callbacks and notify events on the component. This class code can be designed to support required functionality and application features.

The next section of application code is for instantiating a class object and initializing the class object of the component. This section may also have the code for initializing variables and customizing the state of the component.

The last section of the application code comprises the XML graphics code for presenting the component. The event listeners of the XML graphic elements may call the application component object's methods. Furthermore, upon calling the object's methods, the methods may manipulate XML graphics elements to update the presentation features such as colors, shapes or visibility of the component. An example of fully functional component is the application component of an airplane shown in Airplane.svg (in Appendix file Airplane_svg.txt). The SVG file includes JavaScript file Airline_class.js that comprises components class definition. A code example of JavaScript is Airline_class.js in Appendix file Airline_class_js.txt.

D. Use of GUI Class Module to Generate Graphic Component

A CCG uses GUI Java class modules in generating the graphic elements as building blocks. GUI java class can be designed so that its object is able to generate functional component.

Commercially available pre-built GUI java class modules can be used to generate basic graphic elements such as charts, graphs, trees and maps. Those modules are usually designed to be generic and reusable. They generally support service methods for inputting run time data, and have presentation style of their own. The data inputted to the GUI objects is used to build or customize the resultant application components.

The GUI class module for a basic component may comprise methods for data input, initialization of variables and customization of component properties. The methods allow user to configure the component properties such as size, functionality, fonts and colors. Once a class object is properly initialized using the data provided to it, supported CGM method of the object can be called to generate browser-specific code to present the graphic image of the component.

The object of the GUI class writes JavaScript class definition section in the application code of the component. In the alternative, class definitions may also be placed in a separate JavaScript file, which is referenced in the SVG document. The GUI class object uses user input data and other customization information to generate remaining application code sections. Part of the generated code is for instantiating and initializing the application component's JavaScript object and customizing the application component. Finally, the GUI class object generates an XML graphic element to present the component. Since the data on user preference and customization is passed into the variables of the GUI object, the GUI object uses the data for defining the graphic element so that the image reflects user input data and customization. The code of basic GUI class modules may be designed and tested semi-independently so that it satisfies design objectives.

In the preferred embodiment of the present invention, the CCG or GUI class module for a component comprises methods for facilitating the communications between the component and other application components or comprises code for the component to communicate with external code in the application. To accomplish this function, the CCG class module contains:

1. Methods for returning the names of the service methods in the application component directly or indirectly. Other application components or external code in the web document can use the names to use their services;

2. Methods for inputting names of services, which causes the CCG to include necessary code in the component (a) for looking up external services by name and getting the services, and/or (b) registering the component's service methods with a directory-registration object so external application code can lookup and use its services; and 3. Methods for inputting the names of the service methods of the other application components directly or indirectly. For example, if the CCG object method is called with a valid external function name string, the object includes necessary code statements in the application code it generates. The code statements cause the component to call the external function or to get external services upon an event such as mouse click or state change.

An example of GUI class for airplane component is shown in Airplane.java in Appendix file Airplane_java.txt.

Example 1

Sample Application Code for a Rotate Banner Component

The complete application code of a simple RotateBanner is shown in Appendix file RotateBanner_svg.txt. It has a list of four subcomponents for showing stock information (banner) for the companies with tickers ORCL, MSFT, INTC, and SUNW, respectively. Upon being loaded, it displays only the first component for ORCL. It displays the next component in the list when a user clicks on the currently displayed banner. When the user clicks on the last banner, it displays the first banner, for ORCL again. The source code for the figure contains four sections: Section One contains global variables and code to initialize them, and Sections Two to Four contain the code of the RotateBanner component.

Upon initial loading, only the banner for ORCL is set visible. Upon clicking on the initially displayed banner, the object's listener function display_banner(idx) is called, which hides the currently displayed banner and displays the next banner, MSFT (Note that index is used from 0 to 3). Upon clicking on the banner again, display_banner( ) is called again, which hides the displayed banner and displays the next banner, which is the banner for INTO. Clicking on this banner will cause it to show the banner for SUNW. At this point, one more click cause display_banner( ) to display the first banner, the banner for ORCL.

The application's SVG source code is enclosed by the statements: <svg width='500' height='200' onload='svg_doc_onload_init(evt)'> and </svg>. In Section One, the code defines a global variable "onload_init_list", which is an array that may be accessed by any component code to add its initialization function, which is called when the SVG document loaded. The function svg_doc_onload_init (evt) contains the code to loop through the array and calls all these functions. This function is registered in order to be called upon the loading of the SVG document by statement: onload="svg_doc_onload_init(evt)" in the first line of the SVG code. The first section also defines a global variable "SVG_Document", which may be used to access graphics elements in the SVG document. To change the attributes such as color, size or visibility of the graphics elements of the component, the JavaScript code needs to access the graphics elements (group elements vs. graphic element) in the Document Object Model ("DOM") tree. The function "init_svg_doc(e)" initializes the global variable "SVG_Document", when the SVG document is loaded. This section of code is not part of the code of any of the components in the application, however the code defines global variables and objects that can be used by the components in the application.

Sections Two to Four contain the component code of RotateBanner. Section Two contains the class definition of the RotateBanner component. This class has two service methods, which are member functions. The first method is add_baner (baner_id), which may be used to add subcomponents during the initialization of the object. The second method, display_baner(new_baner), may be called to hide the subcomponent currently being displayed and to display a new subcomponent, whose index is stored in the parameter new_banner. This method locates the group element containing the subcomponent using the "ID" of the group, and manipulates its attributes to hide or display. Section Three contains the code to instantiate an object of the RotateBanner and code to initialize the object. Upon initialization, four IDs are added using the service method of the object.

Section Four contains SVG code statements to present the component and its subcomponents. SVG element tag "g" defines a group and can be used to group one or more graphic elements including other groups between the group tags <g> and </g>. Each group element is a parent node in the DOM Tree and contains other graphics elements as children. The "group" element supports attributes such as visibility and transform. The visibility attribute can be set to visible/hidden to show/hide the group. The transform values can be updated or move the group to new coordinates. The code statements define each of the four subcomponents as a group and assign a name to each of the group IDs (banner_id1_UNQ_IDX, banner_id2_UNQ_IDX, banner_id3_UNQ_IDX, and banner_id4_UNQ_IDX). Section Three has code to add the IDs of the group-elements that contain the subcomponents. Each of the IDs can be used to lookup the graphic element (i.e. the group element) and to change the group's attributes to show or hide the group. Each group also contains SVG code of the corresponding subcomponent. The SVG code provides the definitions of graphic images or banners, respectively for ORCL, MSFT, INTO, and SUNW. By selecting style value in the group id line, only the banner for ORCL is set visible while the rest of the three banners are set hidden. Also, each group sets "onclick" event listener to call the object's service method display_baner( ) to display the next subcomponent in the list, using the statement: onclick="rotate_obj_

UNQ_IDX.display_baner (index)". This service method is called when user clicks on the subcomponent.

Although the service methods of the RotateBanner is used within the component code, they are global in scope and may be called from anywhere by any other component in the SVG document. (e.g. rotate_obj_UNQ_IDX.display_baner (new_banner)).

RotateBanner.java: A sample reusable CCG Class for Rotate Banner

SVG component code of the RotateBanner (in Appendix file RotateBanner_svg.txt) is generated by a CCG, RotateBanner.Java (in Appendix file RotateBanner_java.txt), which is a subclass of AgileTemplate (in Appendix file AgileTemplate_java.txt). The CCG, also implemented in Java class, inherits variable UNQ_ID and ACI from the base class AgileTemplate. The CCG has constructors for creating an object instance, member variables for storing input subcomponents, preference data, and configuration data, methods for initializing the member variables, and the CGM for generating the component code. The CGM uses the data, objects and subcomponents in the class variables to generate component code to present the rotate banner.

In the process of generating the component code, the CGM for RotateBanner first prints the "class definition" section of the component using private function generate_class_def (out). The "class definition" section may not be included in the code if the class definition is already written in the web document by an earlier RotateBanner class object instance.

The count of the input subcomponents and the list of the CCG objects for the subcomponents are stored in the class variables. Then, the CGM calls generate_object_init( ) that uses the information on the count and other data objects saved in the CCG class variables to generate code to instantiate and initialize an object for RotateBanner component (Section Three in the SVG document).

Then CGM calls generate_svg_code( ) that generates code to present the component, and each of its subcomponents (Section Four in the SVG document). To get the code for each subcomponent, it may use the CGM of each of the input subcomponents. The CCG appends the string stored in the variable UNQ_ID to the names of global variables, the IDs of SVG elements, and the names of the component's JavaScript object. Each CCG uses a utility to set different string values to UNQ_ID for different subcomponents and, therefore, eliminates the possibility that two variable or function names in two subcomponents are the same in the resultant SVG document. At the time of instantiation of each CCG Object, the UNQ_ID is dynamically initialized to a unique string by the base class AgileTemplate Object constructor. The "ACI" object (of class AC_Info in Appendix file AC_Info_java.txt) is shared by all CCGs. The ACI object has a utility object (of class UniqStrId.java in Appendix file UniqStrId_java.txt) to get a unique string. Each CCG gets a unique string and appends the unique string to the names of global variables, IDs and functions.

The CCG also implements special methods in its java class definition: (1) methods for getting names of service method of the component generated by the CCG object, and (2) methods for inputting data about external components such as callbacks to be invoked by the generated component. This RotateBanner Java Class has following methods: getBannerUpdateMethodName( ) which returns the name of the service method of the component. Since the names of the component's service methods and the object are already defined in the class definition and instantiation, the CCG only need to append the UNQ_ID to the object name to form full name and returns the full name of the service method. The service method can be called from the application code to access the service of the component. Since all the objects are global in the SVG document, the service method of this object can be called anywhere in the SVG document: (e.g. rotate_obj_UNQ_IDX.display_baner(new_banner_index)).

The CCG class has service method setServiceMethodReference( ), which saves a variable name in the class variable Service_func. If the string Service_func is not null, the CGM (i.e. generate_object_init( ) generates additional lines of code in the component to save reference of the service method in the variable, whose name is passed in Service_func. This is an alternative method to get access to the reference of the service method of the component.

Example 2

Sample Application Code for a Radio Button Group Component

A sample application code of a radio button group is shown in Appendix file RadioButtons_svg.txt. It has a list of four radio buttons for showing titles ORCL, MSFT, INTO, and SUNW, respectively. Upon being loaded, it selects the first button for ORCL. If user clicks on an unselected new button, it unselects currently selected button and selects the new button.

The source code in the Appendix file RadioButtons_svg.txt contains four sections: Section One contains global variables and code to initialize them. Section One also contains definition of a test callback function switch_the_banner that calls built-in JavaScript function alert( ) to display its second parameter. Sections Two to Four contain the application component code of the radio button group.

Section Two contains the class definition of the radio_buttons component. This class has two service methods. The first method, add_callback (group_id, cb_name), may be called to set reference of a callback function to the variable callback_func. The reference of the callback is passed in the parameter cb_name. The second method is select_new_button (new_button), which may be used to select a new button. If the new_button is not already selected, this function unselects currently selected button and selects the new button. If the variable callback_func is not NULL, this function also calls the callback function.

Section Four contains SVG instructions to present the radio buttons. This section contains four groups, each group contains SVG code to present each radio button. Also, each radio button group sets "onclick" event listener to call the object's service method select_new_button( ) to select the button, using the statement: onclick="radio_UNQ_ID.select_new_button(button_index)". The SVG code for each radio button defines a title for the button and two circles, an outer circle (with no fill) and an inner circle with fill. The inner circle might be shown to indicate selected state; or hidden to indicate unselected state. The code assigns an ID to each of the inner circle (rbutton0_UNQ_ID, rbutton1_UNQ_ID, button2_UNQ_ID, and button3_UNQ_ID). These IDs are used in Section Three to add each button to the object of the radio button.

Example 3

A Sample Reusable CCG Class for Radio Buttons

RadioButtons.Java (in Appendix file RadioButtons_java.txt) is a CCG class for the radio button group component. The Java class defines the variables for storing input titles for the Radio buttons, and other data. The CCG has constructors, methods for initializing the variables, and the CGM for generating the application code for the AC. It uses the data in the class variables to generate its application code.

RadioButtons.svg (in Appendix file RadioButtons_svg.txt) shows a simple tested SVG component code of the Radio Button group. The CGM for RadioButtons first prints the "class definition" section of the AC. The "class definition" section may not be included in the code, if the class definition is already included in the web document by an earlier object instance of this class.

The titles and count of the radio buttons are stored in the class variables. The CGM uses the information on count and titles to generate code to instantiate and initialize an object for RadioButtons component (Section Three in the SVG document). Then CGM generates code to present each of the radio buttons (Section Four in the SVG document). The CCG code appends string stored in the variable UNQ_ID to all names of global identifiers in the code for the AC, in order to make the names unique and exclusive in the SVG document.

The CCG class has special methods for inputting the names of external functions such as callbacks. The callback is invoked by the generated AC of the RadioButtons upon selection of a new button. This Java class has method setCB_AddMethod(String cb_name) to set a callback for the RadionButton component. Upon calling of the Java object method setCB_AddMethod (String cb_name), which saves the string passed through the parameter cb_name in the class variable "callback".

For example, if 'cb_name' parameter has initialized to string "switch_the_banner", the method setCB_AddMethod( ) assigns string "switch_the_banner" to the object's variable 'callback'. If variable 'callback' is not NULL, the CGM generates application communication code. The CGM has the following code to generate communication code:

if (callback !=null)
out.println("radio_"+UNQ_ID+".add_callback('none', "+callback+");");

Assuming variable 'callback' is assigned to string "switch_the_banner", the above code includes the following communication code in the RadioButtons' component code:

radio_UNQID.add_callback('none', switch_the_banner).

Likewise, it is possible to implement one or more special methods in CCG to input the names of functions implemented outside of the application code of the component. If one of the special methods is called to input a name of a function, the CGM of the CCG includes communication code inside the application code of the component so that the component calls the function.

This Java Class also has an alternative method getCB_AddMethodName to facilitate setting a callback for the component. This Java class method returns service method name "radio_UNQID.add_callback". The container CCG may use the service method's name and generate the above communication code to set a callback for the AC of RadioButtons. This Java Class also has method: getButtonSetMethodName ( ) which returns the name of the service method radio_UNQ_ID.select_new_button of the AC. The service method may be called by an external code in the web document to select a new button in the Radio Buttons group: (e.g. radio_UNQ_ID.select_new_button (new_button)).

E. Designing the CCGs for Application Components

The next step is to build a CCG for each of the components. A CCG may be designed and developed separately for a specific component or service in the application.

Figure 6A:
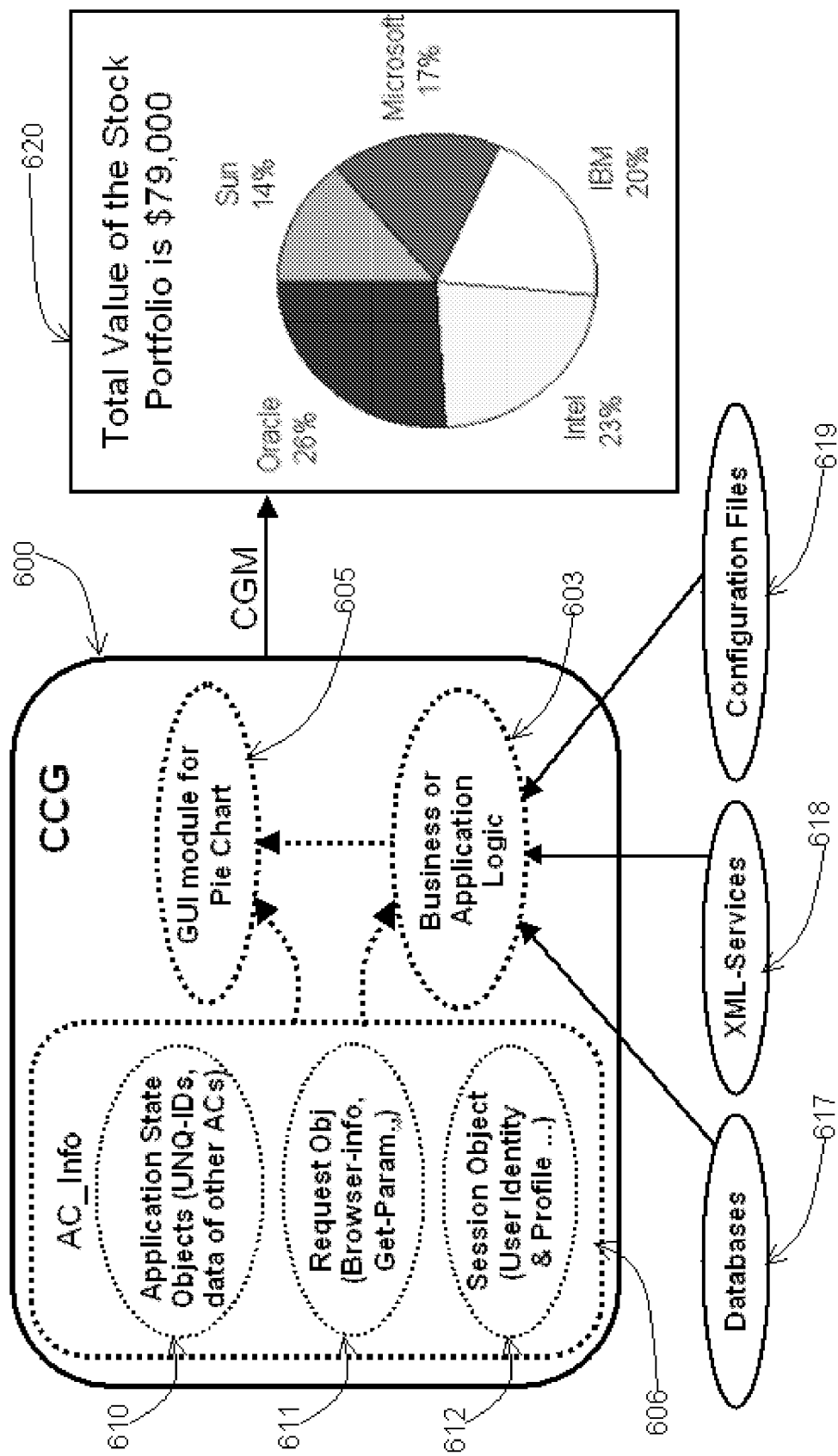
FIG. 6A shows inner code structure of a CCG and its relationship with GUI object, according to one embodiment.
Figure 6B:
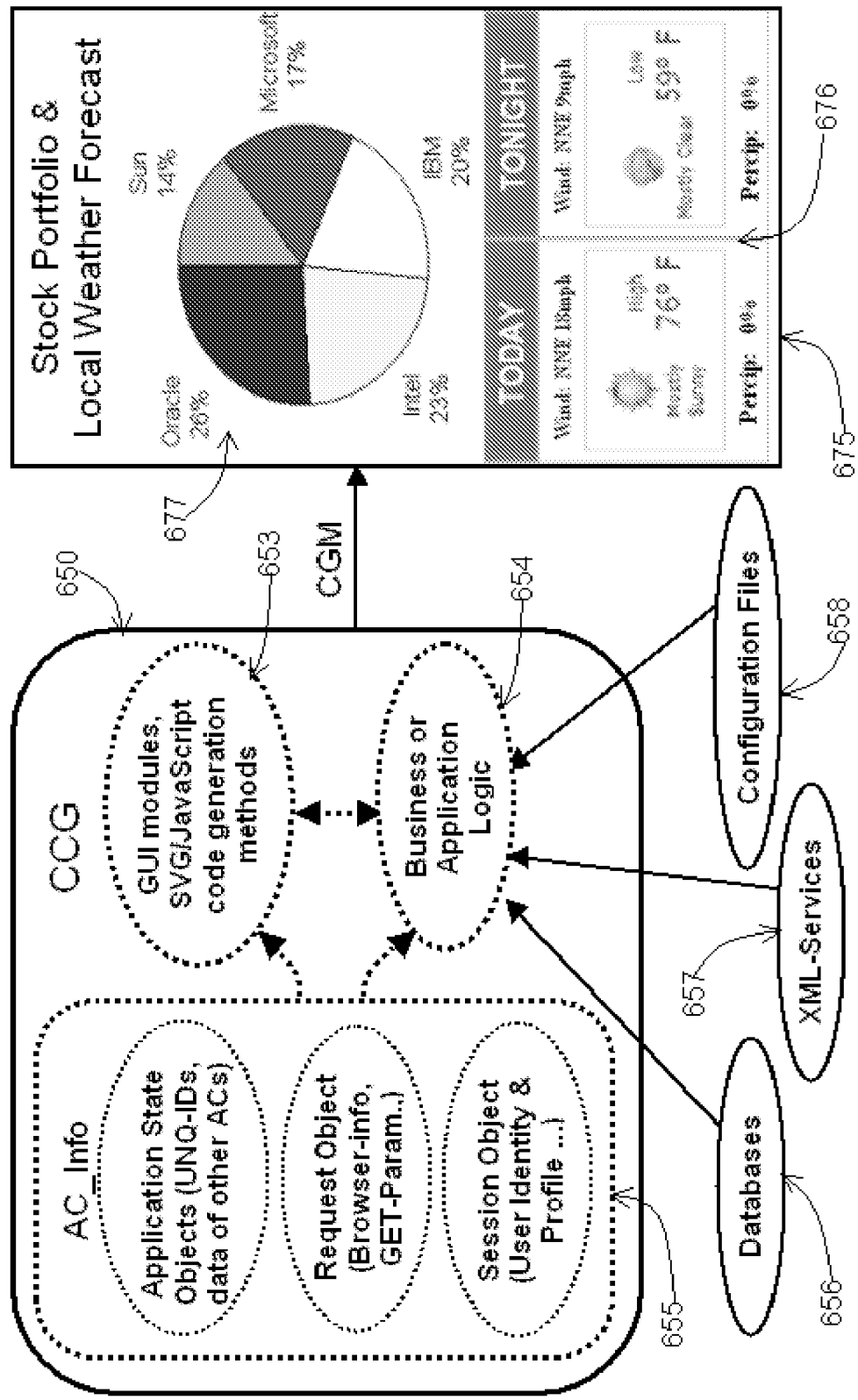
FIG. 6B shows general inner code structure of a CCG that uses GUI object to show portfolio pie chart and also has presentation logic code to generate SVG code to present weather information.

In the preferred embodiment, a CCG is coded in Java class for each of the components and designed to be mostly independent and cohesive, and is able to create custom application component at run time using user information, user preference data and other browser-specific information, as shown in FIGS. 6A and 6B. Since an online application may have multiple components, each of the CCGs for the components should be designed so that it is capable of generating complete and functional code for the component.

The CCGs encapsulates both the code for implementing business or application logic and the code for generating application code in JavaScript and XML graphic elements to present the component. Alternatively, the CCG implements business logic 603 to get data for the component and uses pre-built GUI module 605 to generate component's presentation code. The CCG 600 also comprises methods for generating the code necessary for the communication between the component and subcomponents and between two subcomponents. Properly designed CCG need less code for initialization and for generating communication code when a container CCG uses a subcomponent CCG.

In a case where a component substantially contains the application code of a subcomponent, the CCG for the component (e.g., the container component 500) can be built in part by using the CCG for the subcomponent. The subcomponent CCG is incorporated in the container CCG by instantiating an object of the subcomponent CCG. Alternately, the subcomponent CCG can be declared or instantiated outside and input the object reference of the subcomponent CCG using the methods of the container CCG. The container CCG, during execution, uses the methods of the subcomponent CCGs to initialize and customize the subcomponents. The container CCG comprises code statements for accessing necessary data from the data sources to initialize and to customize the component. One pseudo-code example is AirlinerCF.java in Appendix file AirlinerCF_java.txt. The CCGs for subcomponents may optionally be GUI modules.

Example 4

A CCG for a Component Showing Weather Information

The weather component is intended to show weather condition for any locality for which data of weather condition are available. Thus, the preferred implementation is that the CCG can take city name or zip code as a parameter. When a web user entered a city name or a zip code, the CCG takes the city name or zip code as an input to access the database for the latest weather information for the city or zip code, and creates the HTML code to present the weather component for the city or zip code (FIG. 2).

The designer of the CCG has to decide what information to be included in the component. A weather component does not need to include all weather parameters, which are collected by weather observing stations. The selection of weather parameters may affect the future application of the weather component. A weather component should include all essential weather parameters such as high and low temperatures, and wind intensity and direction as shown in FIG. 2.

In the preferred embodiment, the CCG is Java class, which has required code in business logic for accessing appropriate real time data from external sources and creates browser-specific application component that carries real time weather information.

The CCG can be instantiated in any JSP/Servlet and only a few lines of code are necessary to initialize its object. Any application, which needs weather information, can use this CCG to custom-create the component to show the weather conditions for the city or the zip code in real time.

Example 5

A CCG for Stock Quote

Figure 7:
FIG. 7 shows the IBM stock information, respectively, for Intraday and 1-year period, according to one embodiment.

The CCG for the stock quote, which is also coded as Java class, takes a ticker symbol of a company as input, and creates application code in SVG language to present the stock quote in table/chart format for company represented by the ticker symbol (FIG. 7). The CCGs can be independently refined to meet evolving needs. The CCGs are independent of other components and any modification or update to it requires minimal amount of coding work.

F. Devices for Making CCGs Intelligent and Adaptable

In the preferred embodiment, the CCGs are designed to be not only 'independent' but also intelligent in using user profile data about client preferences, security, and authentication in the process of building the application code in run time.

When GUI class modules are used, the GUI classes have data input methods for getting data but usually do not have method for accessing external data. They usually do not contain application code for getting data from databases nor code in business logic, either. In contrast, a CCG normally contains application-specific code for implementing business logic. Thus, the application component generated by a CCG reflects specific business transaction and system performance. In addition to the data from user input, the CCG can have data-accessing method for getting business data from external source in real time. Therefore, the application component also reflects real time data The application component that a CCG generates may comprise DOM and JavaScript functions offering interactive features like popup tool tips. The code block of the component generated by an online GUI class module encapsulates code for presentation, animation and interactivity in a block of code. Furthermore, the component code may comprise service methods for external components to use its services. The CCG Object may have methods, which can be used to configure its component appearance.

For example, the stock-quote CCG may contain method for accessing user profiles and customizing the component for each user according to user preference. Thus, any application using the stock quote CCG can call the method to customize the stock quote component. (See the previous example in FIG. 6B).

The second method used to build intelligent and adaptable CCG is to use 'Request' and 'Session' objects, which may be passed to the CCG. An object "ACI" 606 of the class "AC_Info" is passed to all the GUI objects and CCG objects. The "ACI" stores the references to 'Request', 'Session' and other objects 610-612. The AC_Info class code example is in Appendix file AC_Info_java.txt. AC_Info.java comprises AppConfigInfo.java that stores application context information. AppConfigInfo.java code example is in Appendix file AppConfigInfo_java.txt. Those objects may comprise information about requesting browser, user's profile and database address and connection specifics.

If many CCGs have been built and are available, they can be used in the JSP/Servlet to build components for web page quickly as shown in the following example:

Example 6

A CCG for Stock Information Using Subcomponent CCGs

In this example, a CCG for stock information table takes ticker symbol as one of its input and access the latest stock data from an external source, and use the values of latest stock data in building the stock component. A different CCG may be used to generate application code to present intra-day stock movement chart. Those CCGs can be used in a JSP file to build application code for presenting stock information (shown in FIG. 7).

```
1. <svg height="750" width="500">
2. <% AC_Info ACI=new AC_Info (request, application);
3. String Ticker=request.getResource("TickerSymbol");
4. %>
5. <g transform="translate(0,0)">
6. <%
7. AgileTemplate CCG1_Table=new StockInfoTable(ACI, Ticker);
8. CCG1_Table.CGM(out);
9. %>
10. </g>
11. <g transform="translate(0,250)">
12. <%
13. AgileTemplate CCG2_Chart1=new IntraDayChart (ACI, Ticker);
14. CCG2_Chart1.CGM(out);
15. %>
16. </g>
17. <g transform="translate(0,500)">
18. <%
19. AgileTemplate CCG3_Chart2=new MonthlyChart (ACI, Ticker);
20. CCG3_Chart2.CGM(out);
21. %>
22. </g>
23. </svg>
```

In line 2, an ACI object is instantiated. The parameters 'request' and 'application' are global objects provided by web server. In line 3, a ticker is determined. Transform attribute at line 5 determines the X & Y coordinates of the Table with respect to the container component. In line 7, CCG Table is instantiated and initialized. Table.CGM(out) in line 8 calls the method to generate the application code. The statements at lines 11-16 and 17-22 are similar to those at lines 5-10 except that the line charts are created for daily stock and monthly stock information.

Figure 8A:
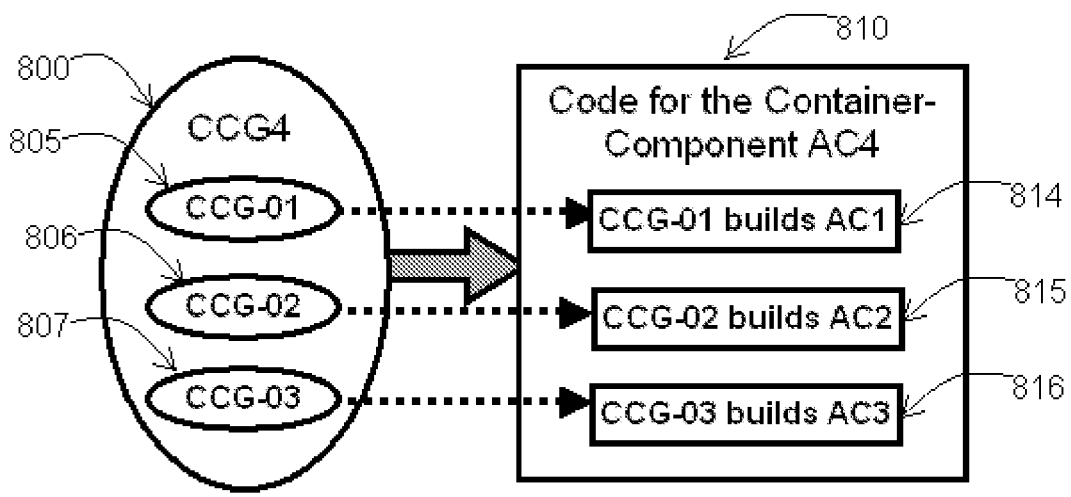
FIG. 8A shows how a CCG for a container component uses three subcomponents CCGs to generate application code for the subcomponents inside the container component, according to one embodiment.

The following pseudo-code shows how a larger CCG (FIG. 8A) uses other subcomponent CCG to build application code:

```
1. Int CGM (StreamWriter out)
2. {
3. String Ticker=this.Input_TickerSymbol;
4. out.println("<g transform='translate(0,0)'>");
5. AgileTemplate CCG1_Table=new StockInfoTable(ACI, Ticker);
6. CCG1_Table.CGM(out);
7. out.println("</g>");
8. out.println("<g transform='translate(0, 250)'>");
9. AgileTemplate CCG2_Chart1=new IntraDayChart (ACI, Ticker);
10. CCG2_Chart1.CGM(out);
11. out.println("</g>");
12. out.println("<g transform='translate(0, 500)'>");
13. AgileTemplate CCG3_Chart2=new MonthlyChart (ACI, Ticker);
```

14. CCG3_Chart2.CGM(out);
15. out.println("</g>");
16. }

The code in line 5 instantiates and initializes the CCG. It at line 6 then generates a table showing stock information for the ticker company. By looking at the pattern, lines 8-11 write application code for showing daily stock information and lines 11-15 write application code for showing monthly stock for the ticker company.

Figure 9:
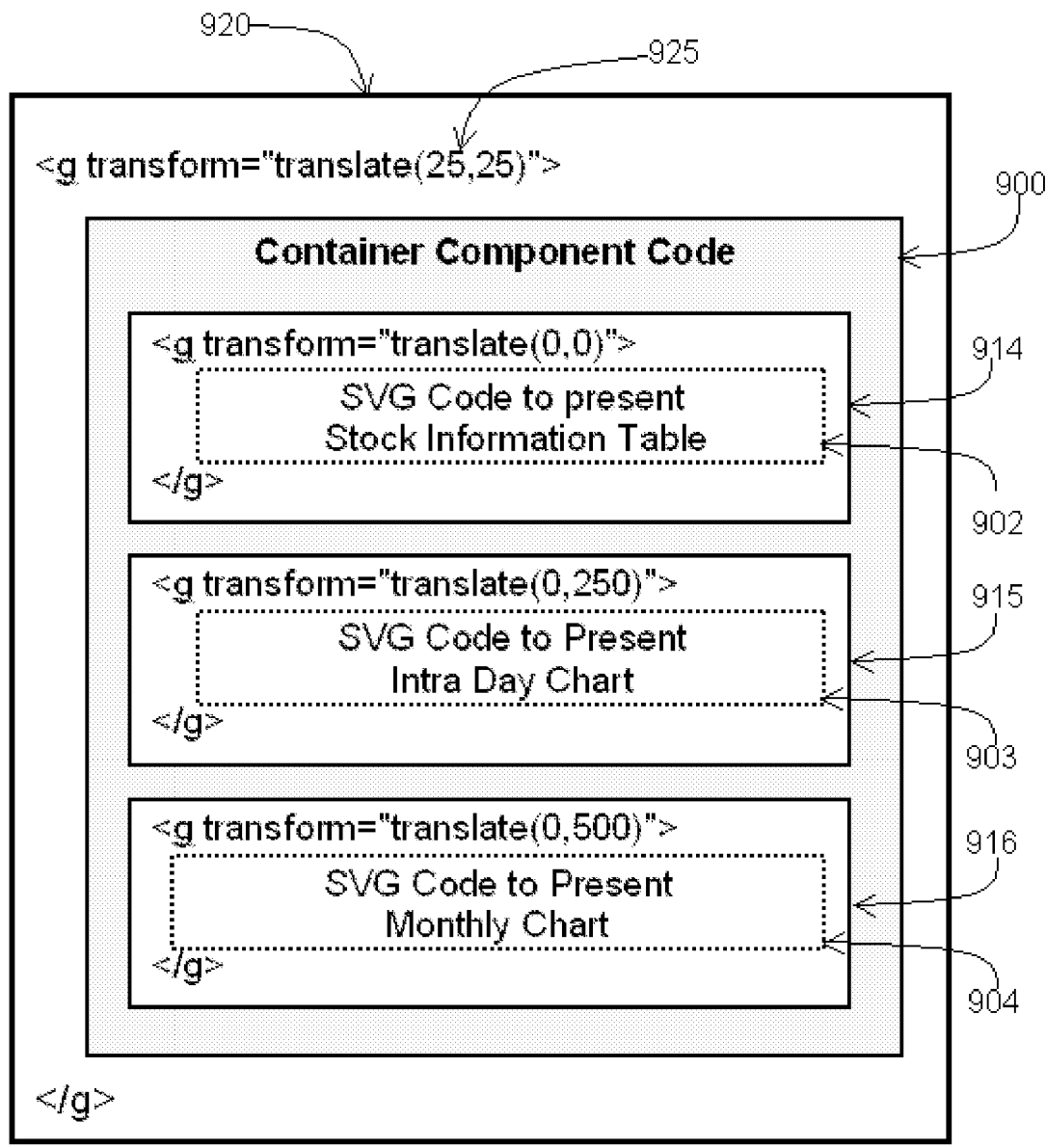
FIG. 9 shows basic SVG code structure of a container component that has a stock quote table and two stock movement charts as subcomponent, each subcomponent's code is in an SVG group element, and also the code for the container component is in an outer SVG group, according to one embodiment.

CCG can be designed to build the application component according to user preferences, functional customization and access privileges dynamically. A CCG may be designed to dynamically use any of plural CCGs class objects of subcomponents in generating the application code of the subcomponents (FIG. 9 shows the SVG code structure of the container component 900 and the subcomponents 902-904.).

Example 7

CCG for Stock Quote Selecting Subcomponents Dynamically

This example shows how a large CCG for stock quote uses subcomponent CCGs respectively for 1 Month, 3 Months, 6 Months and 1 Year to generate a chart of choice. The container CCG allows the user to select one subcomponent CCG by user input. For example, the following code can be substituted at lines 13-14 in the above listing.

Figure 8B:
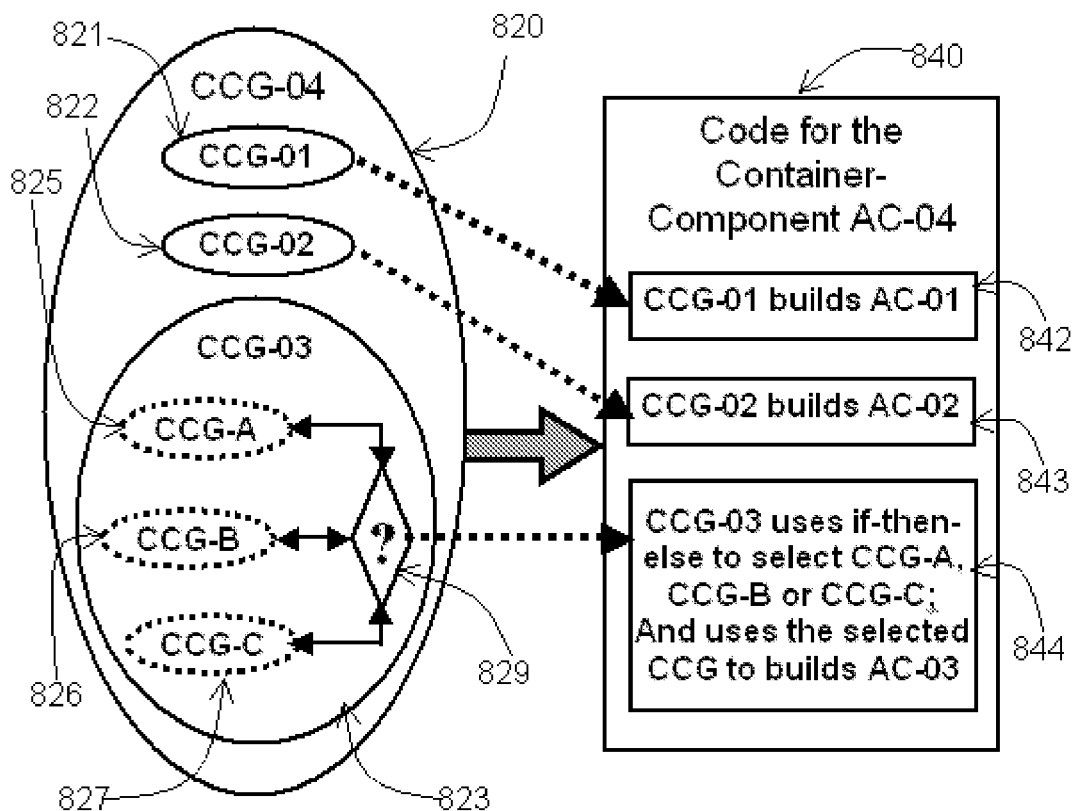
FIG. 8B shows how a CCG for container component chooses one of the three subcomponents and two other subcomponents to generate application code inside the container component, according to one embodiment.

1. AgileTemplate CCG3_Chart2=null;
2. If (user_preference==1 month) CCG3_Chart2=new MonthlyChart(ACI, Ticker);
3. else If (user_preference==quterly) CCG3_Chart2=new QuterlyChart(ACI, Ticker);
4. else If (user_prefers==half_yr) CCG3_Chart2=new HalfyearlyChart (ACI, Ticker);
5. else CCG3_Chart2=new YearlyChart (ACI, Ticker);
6. CCG3_Chart2.CGM(out);

During execution, the CCG uses 'if-then-else' statement to invoke the right subcomponent CCG at run time (FIG. 8B). If the user chooses 1 month as user preference, the CCG creates an object using MonthlyChart Class. If the user chooses quarterly, the CCG invokes the code for generating quarterly chart. It finally generates the code for showing the selected stock information. By using such similar program control, a CCG might be designed to generate plural charts according to user preference.

G. Encapsulates Detailed Code within CCGs

The following pseudo code shows how a CCG (FIG. 6A) encapsulates the code implementing business logic inside and uses another CCG object, or GUI objects, to generate the application code which in part has a pie chart shown in FIG. 1.

1. public class PortfolioCF extends AgileTemplates {
2. Float val[ ];
3. String names[ ];
4. Int count=0, account_number=0;
5. void CGM (PrintWriter out) {
6 InitPortifolioData( );
7. ATPie Pie1=New ATPie(ACI, "Portfolio at the end of 2nd Quarter");
8. Pie1.setData(count, val, names);
9. Personalize_Component (Pie1);
10. Pie1.CGM(out);
11. }
12. PortfolioCF (AC_Info ACI, int number) {super(ACI); account_number=number;}
13. void InitPortifolioData( ){
14. }
15. void Personalize_Component (ATPie Pie1) {
16. }
17. }

The Java class of the CCG extends the 'Agile-Templates class' and implements the abstract class method: CGM (PrintWriter out). The CCG reads required data from data sources and may access user data about the identity, access privileges and display/layout preferences from the session object. It generates application code for the component. The application code, upon being sent to the viewer/browser, displays the component.

The lines 2-4 declare valuables that are initialized at run time at line 6. The CCG's construction method at line number 12 inputs and initializes the account number of the user. The class code also has a method "InitPortifolioData" at line number 13. The code for the body of the function is not shown. This body includes necessary code for accessing data from databases for the account number and initializing the class variables vals[ ], names[ ] and count. The class may use the information stored in "ACI" to get the information such as database connections, user preferences and browser type.

The class code also has a method, "Personalize_Component( )" at line number 15. The code of the function body is not shown. This body includes necessary code for accessing data from databases or configuration files for the account number. This function can customize the component based on user preferences or profile. For example, the customization may comprise component size, including user name in the footer, fonts or colors.

It has a Code Generation Method ("CGM") at lines 5-11, which instantiates a new GUI class object pie using title "Portfolio at the end of 2nd Quarter" at line 7. The call to the function "InitPortifolioData" at line 6 initializes the declared class variables. The line 8 sets data in the class object using the values of the declared valuables. The call to the function "Personalize_Component" at line 9 customizes the pie component. Finally, line 10 writes SVG code to the 'out' stream for presenting the pie.

Once a CCG for user_portifolio is built, another large CCG may use this CCG to build itself a subcomponent. The large CCG first instantiates a class object, user_portifolio, using a particular account number as a parameter to the constructor. It then calls and uses the class object to generate the portfolio pie chart as follows:

PortfolioCF user_portifolio=New PortfolioCF (ACI, user_account_number);
user_portifolio.CGM(out);

If the user has five companies in his portfolio, the chart shows stock information for the five companies. The chart may reflect other information such as user preferences. The CCG class uses the account number to lookup the necessary information from the data sources. For example, a stock portfolio component may have an accompanied weather information which uses the city or zip code where the user is located (FIG. 6B).

The CCG encapsulates code of presentation logic and business logic. The CCG may generate SVG and JavaScript code to support miscellaneous functionality such as interacting with other subcomponents and placing, moving or hiding subcomponents (FIG. 6)

Figure 10:
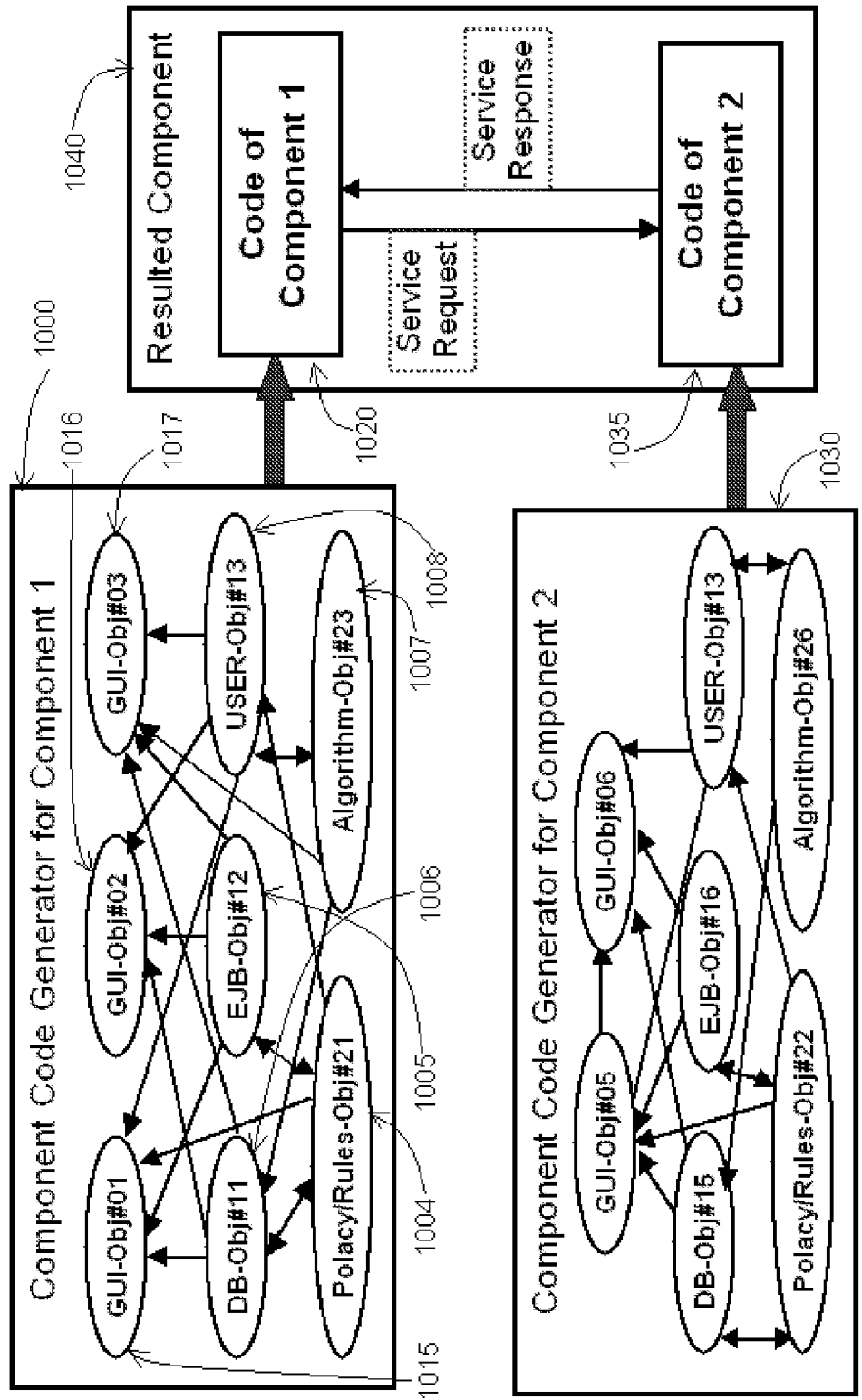
FIG. 10 shows how a CCG uses a variety of objects to generate component code, according to one embodiment.

The large CCG 1000 may contain code for accessing external database objects 1006, user information objects 1008, and pre-built Enterprise Java Beans objects 1005 for data to be used in initializing and building the component 1020 (FIG. 10). It may also use rules, policies 1004 and algorithms 1007 for processing the data. It also may use multiple GUI modules 1015-1017, each to build a subcomponent or part of the code for the large component. All the information is used to build and customize the resultant application component and the graphic elements.

In the above examples, the CCG for an application component encapsulates all the necessary code within the module.

Many applications use graphical components to simulate or model systems, environments, and interactions between objects in real time. Applications may model weather change patterns, geographical features, air traffic control systems, decision-making process, and real time data analysis.

Example 8

The Taxicab Component

A taxicab application displays moving taxi on a city map. The map and taxis must be redrawn frequently so that the map will reflect the position of the taxis in real time. Each of the taxis on the map is shown by a small image, which pop-ups a small window upon clicking on it to show additional information such as availability status, current location, and capacity. The Taxicab component comprises not only the code for presenting the taxi information, but also the code of service methods, which may be used by external code or other application components to interact with the taxi. If the taxi is about to be out of service, it is necessary to enter a notation like "out of service 12 am". This component has to provide a mechanism for the external component to register event notification methods or callbacks, which is called upon the happening of an event.

Prospective Example 9

The Power Grid Monitoring Display

A power grid operator monitors the condition of power grid and controls power distribution in real time. The condition of the power grid may be shown in a panel comprised of dial knobs and meters, using the data acquired from measuring line voltage, power usage level and data entered by operator such as scheduled outages. The control panel should also allow the power grid operator to control or change power distribution condition, change setup values, conduct special measurements, and change the power distribution method.

Thus, the application code of the components in the control panel needs to implement corresponding service methods for reading data, conducting measurements, resetting setup values, and registering external callbacks. If a power grid operator changes the setting of a dial control in the panel, the application component calls the callbacks to notify the change and provides the new values to the application.

H. Methods of Integrating Application Components

Figure 11:
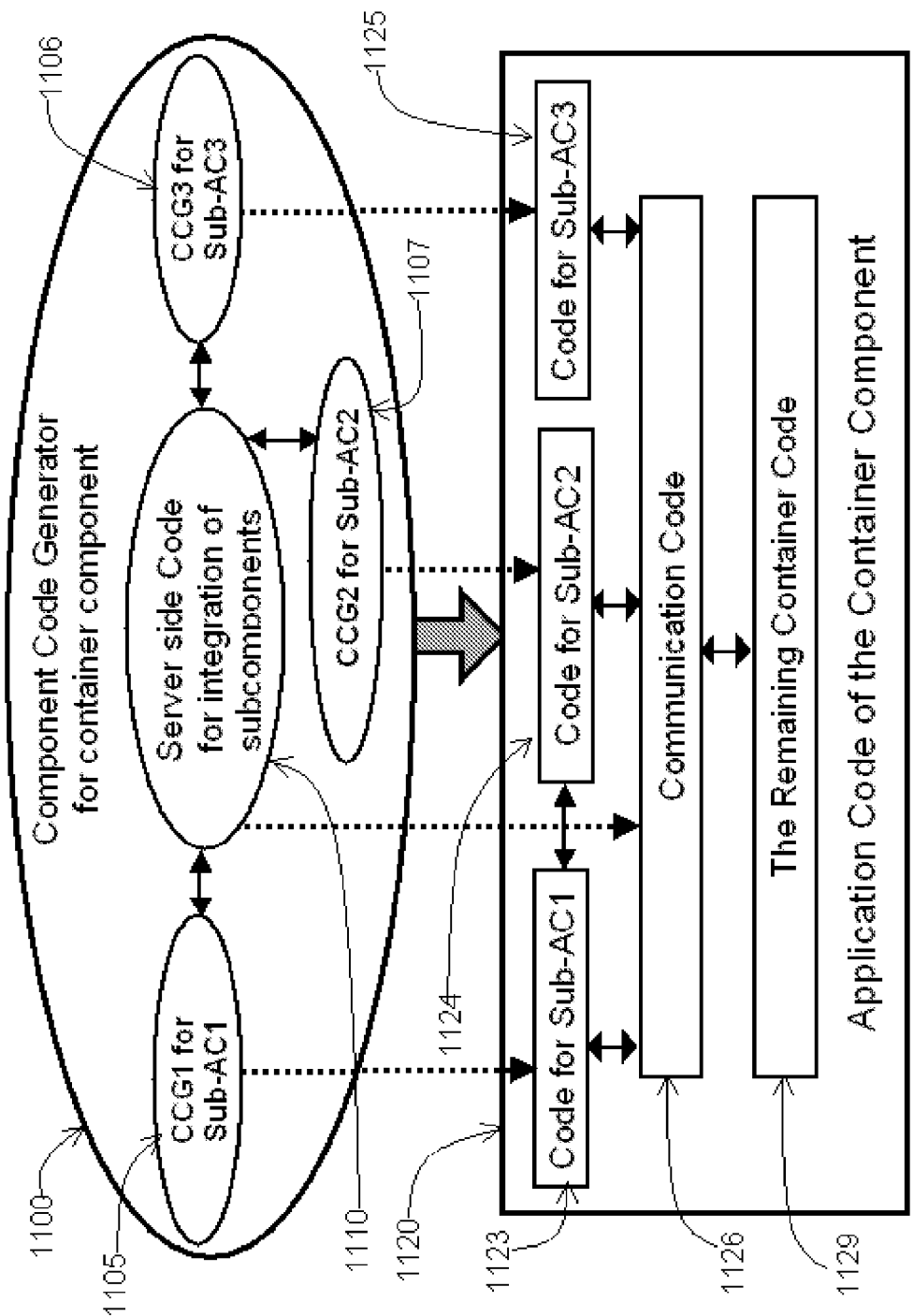
FIG. 11 shows how a CCG generates subcomponent code, communication code, and remaining component code for a container component, according to one embodiment.

When an application component has plural subcomponents, the subcomponents may need to communicate with each other at client. One subcomponent may need to exchange data with other subcomponents, and call and use the service method of other subcomponents, and notifies an event to other subcomponents upon the happening of an event such as mouse click, change of state and/or data arrival (FIG. 11). Some of the preferred methods for integrating application subcomponents in the web document are described as follows.

1. Using Server Integration Code to Generate Communication Code

Server integration code is implemented in a JSP or container CCG which include the CCGs for subcomponents. In the preferred embodiment, each of the CCGs comprises, in its Java class definition, one or more special methods for (a) getting the names of service methods that are implemented in the code of AC or (b) inputting the names of external functions implemented outside of the code of AC into the object of the CCG. These special methods in each of the CCGs are used in generating communication code, for example, to notify events or to exchange data between the AC and external application code.

Figure 12:
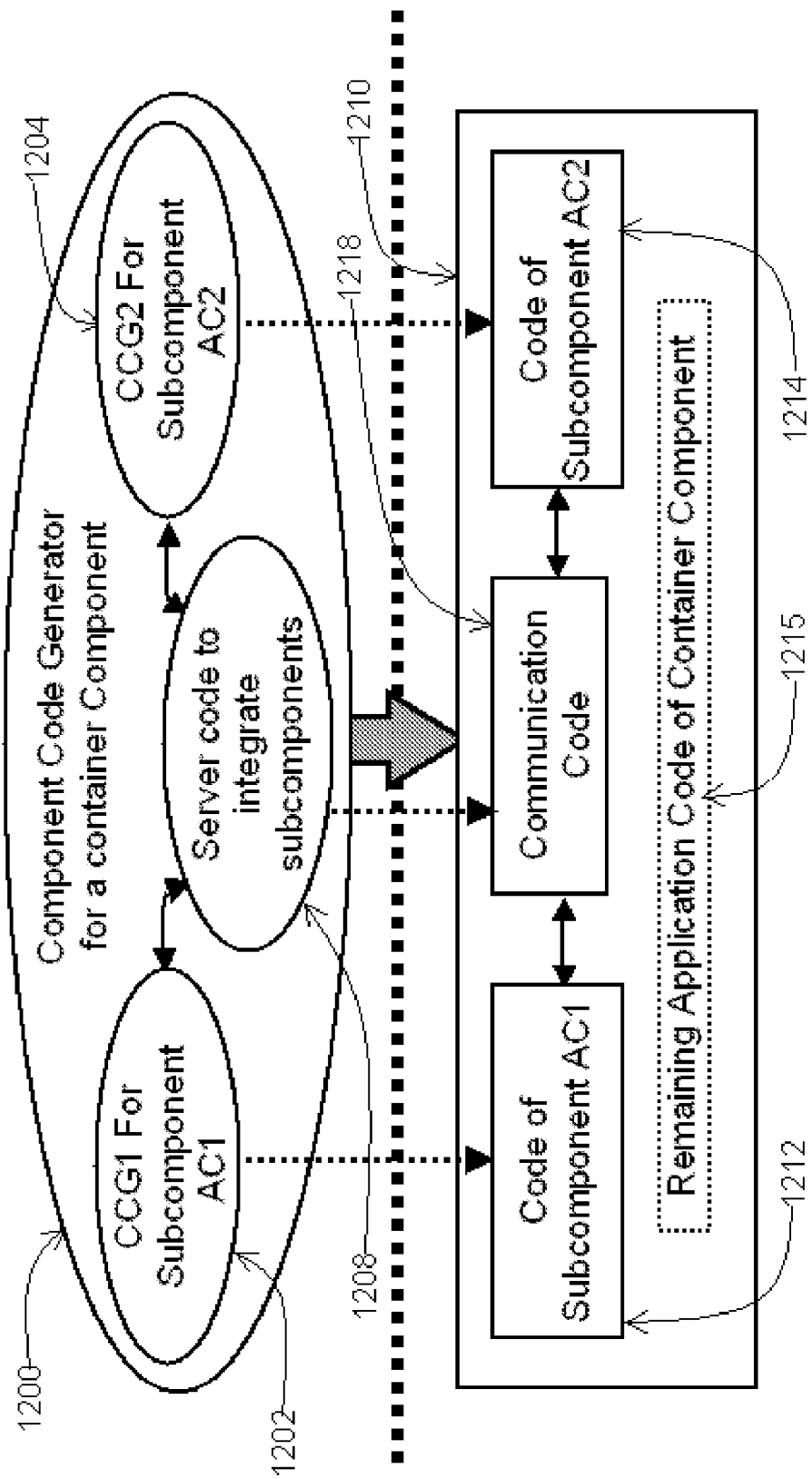
FIG. 12 shows how a CCG generates subcomponent code and communication code, according to one embodiment.

In case of a container CCG that generates a container component (FIG. 12), which has subcomponent AC1 and AC2, AC1 may need to call AC2's service method and vice versa. Also, a function ("an external function") inside the container component but outside AC1 and AC2 may need to call AC1's service method or AC2's service method. AC1 and AC2 may also need to call the external function. The calling of a function in any of those cases may be coupled with data exchange because the data can be passed as function parameters directly or by passing reference of data objects. Alternatively, data can be exchanged by storing the data in shared global objects before calling the function.

Figure 13:
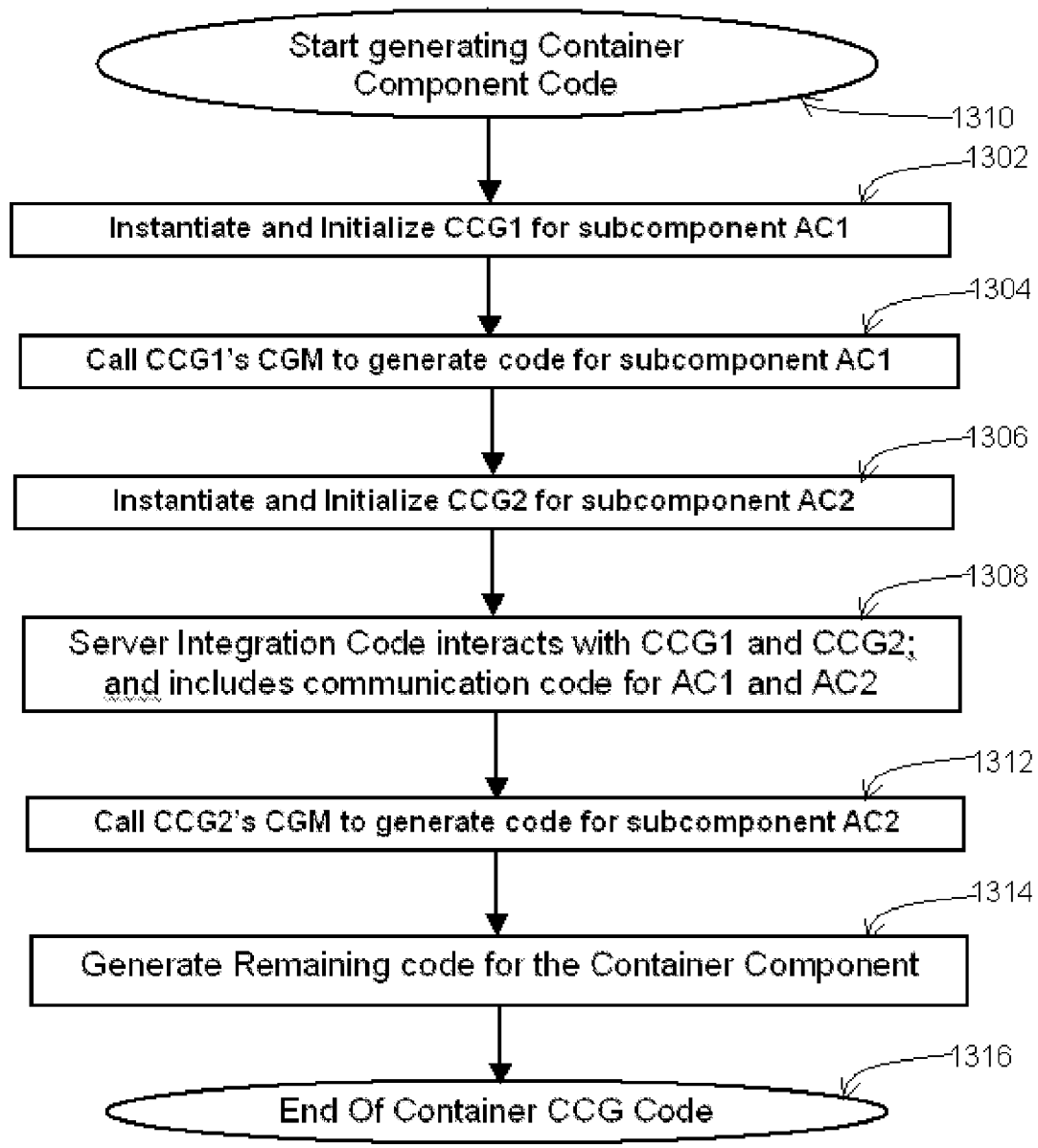
FIG. 13 shows the general steps by a container CGM in generating application code of the component, according to one embodiment.

The steps for CGM of a container CCG, where the CCG uses two CCGs for subcomponents to build the container component is shown in FIG. 13.

In the case where the design objective is to allow application component AC1 to call a service method SM2 inside the application component AC2 in the client platform, and AC1 and AC2 are generated by CCG1 and CCG2, respectively, the necessary communication code can be generated in the container application code by the container CCG by using the following steps:

(1) Calling the special method of CCG2 in the server run time to get the name of the service method SM2 that is implemented in AC2;

(2) Generating the body of a callback function, whose body includes a statement for calling the service method SM2 whose name was acquired in step 1;

(3) In case the object is to let the subcomponent AC1 call the external function generated in step 2, the steps may be as follows:

(a) Calling the special method of CCG1 to input the name of the callback function generated by the server integration code in step 2; and (b) If an external callback function's name is inputted, the CCG1 includes a part of the necessary communication code in the code of AC1 that in effect calls the external callback function.

Obviously, it is also possible to generate communication code so that second AC can use the service method of the first AC or the container application component and vice versa. This makes inter-component communication possible between the components that are generated by the CCG objects.

For example, in case the objective is to let a subcomponent invoke a callback function implemented outside of the subcomponent, the method is shown in step 3. In case the objective is to let an external code call a service method implemented in a subcomponent, steps 1 is used to get the name of the service method.

Example 10

Method to Set an External Callback Function for a Component

The detailed application code is shown in RadioButtons.svg (in Appendix file RadioButtons_svg.txt). This example shows how to set an external callback function for an application component and how the application component calls the external callback function.

The component displays four radio buttons, respectively for four tickers. When a user clicks on a button, it invokes an external function to show an alert message box, telling the user which of the buttons the user has clicked. Only JavaScript code relevant to integration between the external function and the radio buttons component is discussed below. The container application code has the following function for showing the alert message.

```
function switch_the_banner(grp, num) {
alert ("New selected button:"+num);
}
```

The class definition of radio buttons component has two methods: select_new_button, add_callback. It also has a variable "callback_func", which initially pointes to NULL. Then, it provides the definition for the add_callback function.

```
function radio_buttons_v1_0(rb_list, first)
{
this.select_new_button=select_new_button;
this.add_callback=add_callback;
var callback_func=null;
function add_callback(group_id, cb_name) {
callback_func=cb_name;
}
function select_new_button(new button) {
if (callback_func !=null)
callback_func(radio_group_id, new_button);
}
}
```

The following line in the application component instantiates and initializes an object of the component for the radio buttons group:

var radio_UNQ_ID=new radio_buttons_v1_0(rbutton_list_UNQ_ID, 0);

At this point, the pointer variable "callback_func" is still set to NULL and not associated with any particular function. The following statement makes necessary association:

radio_UNQ_ID.add_callback('none', switch_the_banner);

Inside the function of add_callback( ) the parameter cb_name is assigned to the variable callback_func by the statement callback_func=cb_name. Since switch_the_banner is a function reference passed as cb_name, the effect of the above statement is to assign the reference of the function switch_the_banner to the variable callback_func. In the presentation code of each of the four graphic buttons, there is a listener function which invokes the class method select_new_button( ).

<g transform='translate(5 5)' onclick='radio_UNQ_ID.select_new_button(0)'>

Clicking on the radio button causes the running of the method of select_the_new_button( ) which invokes the callback_func (radio_group_id, new_button).

Since the callback_func is assigned with the reference of function: switch_the_banner, the clicking causes the display of the alert message. This example shows how an external function switch_the_banner is associated with a callback function reference inside the class object of the RadioButtons component.

Therefore to set any external function, for example, "switch_the_banner" as a callback for the component of the RadioButtons, the following communication code—radio_UNQ_ID.add_callback('none', switch_the_banner)—can be included inside of the RadioButtons component code or outside of the RadioButtons code.

RadioButtons.Java (in Appendix file RadioButtons_Java.txt), a CCG class that is capable of dynamically generating the component code of RadioButtons. The CCG class has method "getCB_AddMethod" to set a callback for the component of the RadioButtons. The following server integration code uses the CCG's method to set "switch_the_banner" as callback:

1. String RadioB_list[ ]={"ORCL", "MSFT", "INTC", "SUNW"};
2. RadioButtons RadioB=new RadioButtons (ACI, RadioB_list, 4);
3. RadioB.setCB_AddMethod("switch_the_banner");
4. RadioB.CGM (out)

rb_rb_example.jsp (in Appendix file rb_rb_example_jsp.txt) has an example.

Lines 1-2, instantiates and initializes CCG object for the RadioButtons component. Line 3 inputs the name of external callback function "switch_the_banner" using CCG's method setCB_AddMethod. Line 4 calls the CGM of the CCG. A previous example titled "RadioButtons.java: A sample reusable CCG Class for Radio Buttons" shows that calling the CCG's special method "setCB_AddMethod" at line 3 causes the CGM to include the following communication code in the application code for the RadioButton:

radio_UNQ_ID.add_callback('none', switch_the_banner);

The above function sets "switch_the_banner" function as callback for the component of the RadioButtons. where UNQ_ID is a dynamically calculated unique string. If line 3 is missing, the CGM at line 4 does not include the above communication code in the component code.

Alternatively, line 3 can be deleted and the above communication code can be included in the container application component code outside of the component code of the RadioButtons after calling the CGM. The CCG class of RadioButtons implements the method "getCB_AddMethodName" that returns the component's service function "radio_UNQ_ID.add_callback". Therefore it is possible to generate the above communication code by using the following server integration code:

1. String RadioSetCallback=RadioB.getCB_AddMethodName ( );
2. out.println (RadioSetCallback+"('none', switch_the_banner);");

Line 1 calls the method getCB_AddMethodName of RadioButtons Java object. It returns the name of the application component's service method "radio_UNQ_ID.add_callback" and stores the name in Java string variable "RadioSetCallback". Line 2 generates the above communication code.

Example 11

Generating Communication Code Between Two Components

In the following example, JSP or container CCG uses two CCG objects to generate their application components in the web document and also generate necessary communication code for including in the web document. The relevant pseudo code is as follows:

1. Function CGM(Out) {
2. CCG1_Class CCG1=new CCG1_Class (Initialization_data1);
3. CCG1.CGM(Out);
4. String ac1_service_method=CCG1.getServiceMethodName( )

5. Out.println("function CB_of_AC2_gets_service_of_AC1(par1, par2) {");

6. Out.println(""+ac1_service_method+"(par2);");

7. Out.println("}");

8. CCG2_Class CCG2=new CCG2_Class (AC1, Initialization_data2);

9. CCG2. setCB_AddMethod ("CB_of_AC2_gets_service_of_AC1");

10. CCG2.CGM(Out);

11. }

It places the code of the subcomponents and their communication code at appropriate locations in application code. The container CCG, instantiates and initializes two CCGs: CCG1 and CCG2 at lines 2 and 8. CCG1 writes application code of AC1 to out stream at line 3. Lines 4-7 are server integration code. Line 4 gets the name of the AC1's service method and lines 5-7 generate the body of the callback function: CB_of_AC2_gets_service_of_AC1. Assuming the name of service method in AC1 is "AC1_UNQID. ActualMethodName" that is stored in string: ac1_service_method. Upon running the server integration code, the CCG generates the following communication code, a callback function, in the application code:

function CB_of_AC2_gets_service_of_AC1 (part par2)
{
AC1_UNQID.ActualMethodName (par2);
}

Line 8 instantiates a class object for CCG2 and initializes it. Line 9 calls service method setCB_AddMethod(cb_name) of CCG2 to set the external callback, "CB_of_AC2_gets_service_of_AC1" for AC2. The method setCB_AddMethod( ) saves the name "CB_of_AC2_gets_service_of_AC1" in a variable in the CCG2 object. When the CGM of the CCG2 is called at line 10, and if the variable is not null, the CGM includes necessary communication code in the code of AC2, which in effect sets "CB_of_AC2_gets_service_of_AC1" as a callback for the component AC2. The previous example "Method to set an external callback function for a component" has shown how it works.

Upon appropriate event on AC2, application code of AC2 calls the callback "CB_of_AC2_gets_service_of_AC1", which calls the AC2's service method "AC1_UNQID.ActualMethodName( )".

An example of container JSP code that uses two components, RadioButtons and RotateBanner, is shown in rb_rb_example.jsp (in Appendix file rb_rb_example_jsp.txt), which uses subcomponents in the include file in subcomponents.jsp in Appendix file subcomponents_jsp.txt.

Normally, a UNQ_ID must be affixed to modify the name of the callback function "CB_of_AC2_ gets_service_of_AC1" to avoid function name conflict. If two instances of CCG objects of the container CCG class type that implements the above CGM are called, each of the CCG objects generates and includes its component in the web application. Then two components from the two CCG objects contain a callback function with the same name (i.e. "CB_of_AC2_gets_service_of_AC1"), which causes name conflict. The above pseudo code example assumes that application always contains only one CCG object of type container CCG class.

For example, an external component needs to call this function (i.e. "CB_of_AC2_gets_service_of_AC1") to get a service of the component of container CCG, the container CCG Class must implement a method to return the string object containing proper function name.

2. Using Directory Services Method

Figure 14:
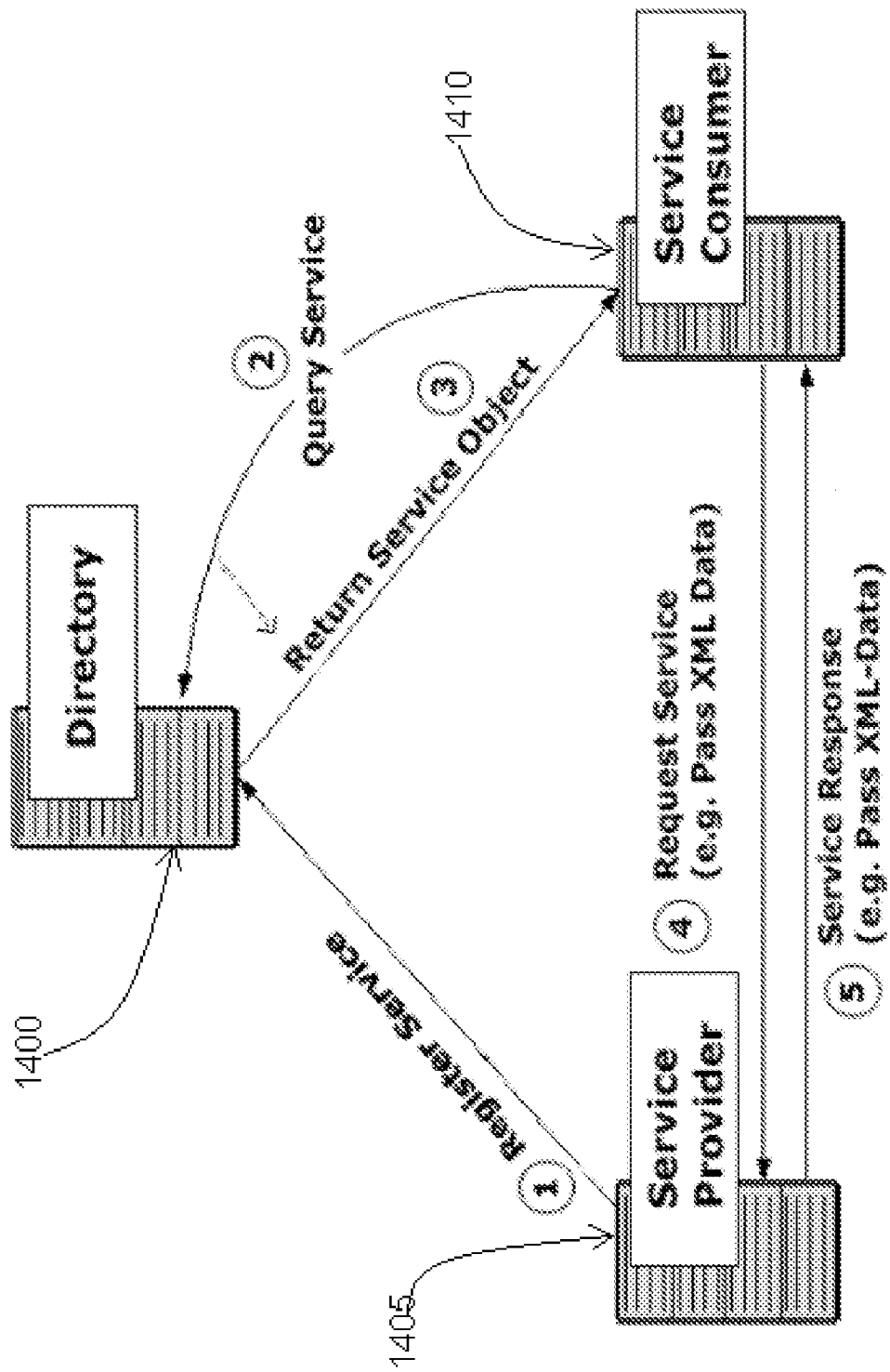
FIG. 14 shows how a component uses a service registration object to register its service and how other components get the service, according to one embodiment.

The application components in an online application may communicate by employing a publish-and-subscribe method (FIG. 14). This method employs a registration component 1400 to hold all names of services like a product directory. The name of the registration component may be reserved or predefined, and its interfaces or calling convention are published in advance and shared with software development teams. The registration component has a service method for adding a new service along with its lookup name and a method for retrieving the service by using the lookup name. One example is shown in directory_obj.js (in Appendix file directory_obj_js.txt).

Each application component 1405 in the web document may register their services with the registration component. To register a service, the application component calls the registration method to input the name of the service and reference to the component's service method or object. When a service is properly registered, its name can be searched. Any application component 1410 may find the reference to the service method of the service by looking up the service using the name. Normally the developers of the service components define and publish the names of the services and communication interfaces (e.g. type and format of each parameter and count of parameters) to get the services in advance. Therefore the developers of other components that need the service can design their components to search for the services using the names and properly call the service function to get the services.

Example 12

Shopping Cart

In a simple shopping-cart application (FIG. 15), the buyer views all items in a selected category, if the user wants to buy an item 1505, the user will click on the icon of the item. At Upon the click, the shopping item will be added to the invoice table 1510. At the application code level, there are two components: Item and InvoiceTable. The shopping Item displays the item for selection while InvoiceTable keeps track of a list of items the buyer want to buy. At application level, the addition of an item to the invoice table is achieved by Item's sending data such as category number, price, and model to the InvoiceTable component.

To accomplish this, the Invoice Table could register its service method using a unique service-name such as "ShoppingCart", and upon selection, each shopping item component look up for the service using the name "ShoppingCart". The shopping item then can use the returned reference to the service method to get the service. The format of the data to be exchanged between the InvoiceTable component and Item component can be predefined.

Example 13

Use of a Registration Class

The SVG document may have global variables and objects. It is possible to define a service registration class: service_register_class and instantiate a global object with a reserved name such as service_register_obj. This registration object resembles a directory table where a list of references for service objects is maintained respectively for a list of unique names.

By using this technique, any component can register a reference to any of its service methods with a unique name. If any other component needs a service, the component can look up the service using the unique name. Therefore, other application component can use the service by calling the service method. (FIG. 14)

Figure 15:
FIG. 15 shows a shopping cart component containing shopping table/invoice and shopping items, according to one embodiment.

For example, an application component for Shopping Cart has service method to add a new shopping item to the ShoppingCart/InvoiceTable (FIG. 15). It uses a predefined name such as "Shopping Cart1" to register the reference to its service method. Then the developer of shopping items can code each shopping item's application component to look up the service method using the predefined service lookup name. Then use the service method to communicate with the Shopping cart component.

Figure 16:
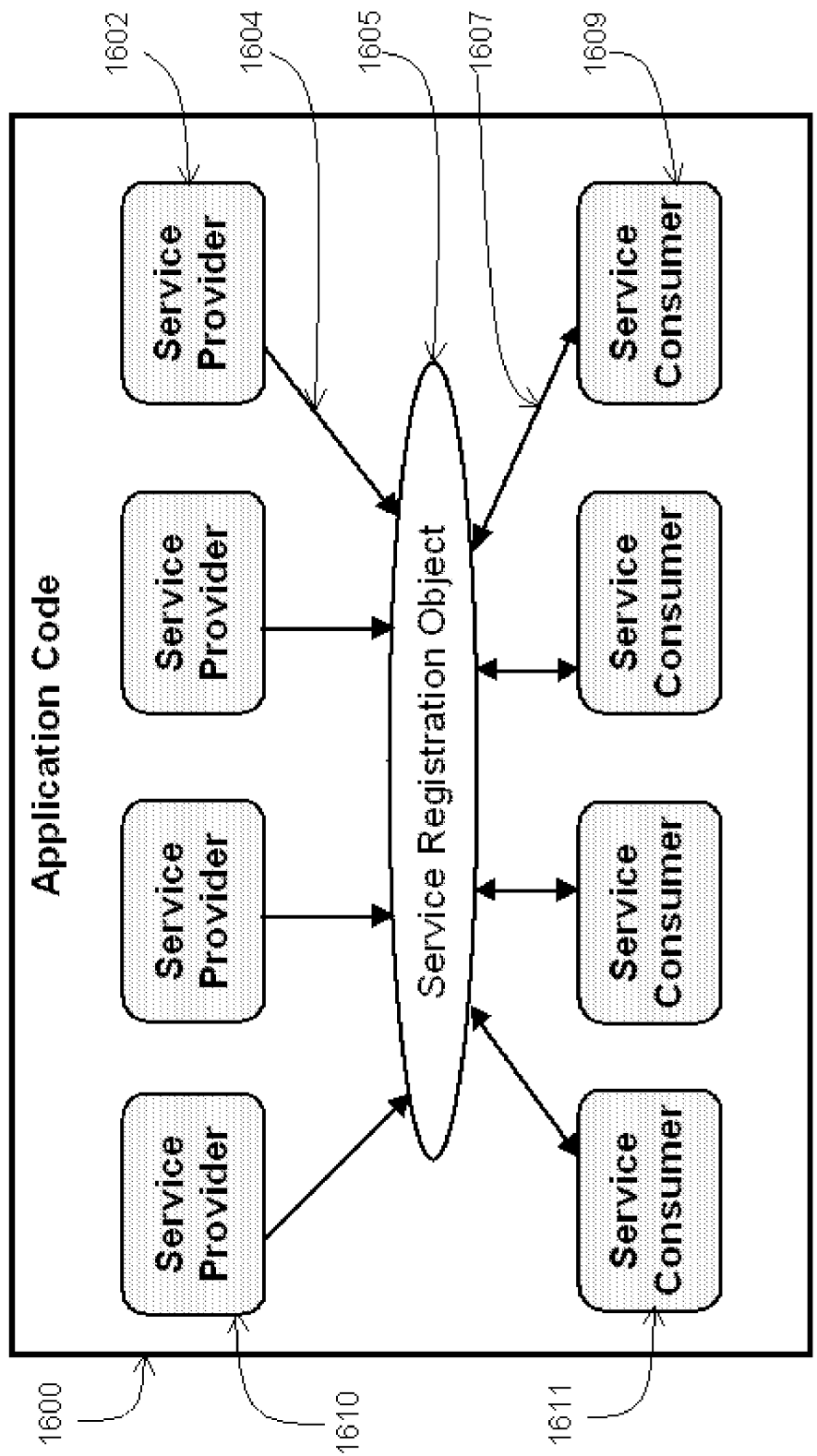
FIG. 16 shows how multiple components can use service registration directory to register their services for other components to find the services, according to one embodiment.

A code example is disclosed in directory_obj.js (in Appendix file directory_obj_js.txt). Multiple service objects or functions of many components or subcomponents may be registered (FIG. 16) according to the general steps discussed in FIG. 14.

The service_register_class can be implemented so that it comprises methods for registering services with a unique name and a method for accessing service. For example, at the beginning of the SVG document, the service registration object may be instantiated:

var services_register_obj=new service_register_class( );

The CCG object can generate code for registering the service with the 'service_register_object' using a unique name. For example, the following code statements may be included in the component code to add a reference to service method of the component:

services_register_obj.add_service("ShoppingCart", shopping_cart_service);

Where "shopping_cart_service" is the service method of the Shopping cart application component and "ShoppingCart" is the lookup name.

If the CCG classes for other application component know the unique lookup name: "ShoppingCart", they can generate the component code to lookup the service and request the service. For example, CCG for each shopping item includes the following instructions in the application component:

1. var service_ref=services_register_obj. find_service ("ShoppingCart");
2. service_ref (xml_data, items_callback);

In order to get the service of the ShoppingCart for adding the item to the Invoice, the user clicks on the item. The Items' component executes the line 1 to get reference to Shopping Cart's service method and executes line 2 to add the item to the Shopping Cart. The first parameter "xml_data" comprises the shopping item's data such as price, model, size and discounts. The Shopping cart's component uses information in the "xml_data" to show and updated invoice table. The "xml_data" string and other function parameters must conform to predefined interface of the Shopping cart component.

The second parameter "items_callback" is reference to a service method of the item's component. The Shopping cart may call this method to communicate with the item's component, for example, to notify if the item is later deleted from the cart. It can be set to null, if the item requires no notification. (Appendix file directory_obj_js.txt comprises an example class code for directory of services component)

I. Method for Preventing Name Conflict.

Applications may contain multiple components, which belong to same component class. A variable name or method name used in one component may happen to be the same as a variable name or method name used in another component. When the two components are used by a container component as two subcomponents, two identical names appear within the container component. This is referred to as name conflict. A name conflict can cause the component to fail in run time. For example, an air traffic simulation component may contain plural airplane components, one for each of the several airplanes. Plural objects of the same GUI class may be used to generate application code for the airplanes; hence airplane components contain similar code, IDs and variable names.

To prevent name conflict, each of the variable and method names must be made unique. Any method that can change the name strings may be used to eliminate name conflicts. In a preferred embodiment, the CCG class is designed so that each object appends a unique ID, which is a character or number string to all the names of the global variables, the names of functions, and the names of graphics elements in the entire application component code. One unique ID is generated for appending onto variable names for each application component. By appending different ID strings to all the names in different components, the resultant names are unique and distinct, thereby preventing name conflicts in the web page.

In the preferred embodiment, a utility Java class (in Appendix file UniqStrId_java.txt) is used to generate a unique ID for each application component. The utility Java object is initialized once in the start of the JSP file. It returns a unique ID each time its method is called. For example, it returns a unique ID for a first CCG and the first CCG appends the ID to all variable names of the component. It then generates a second different ID string for a second CCG and the second CCG appends the second ID string to all the variable names of a second component. By repeating this process, it makes all variable names unique in the entire web document or application. One example is provided for Airplane (the pseudo code flight2_example.jsp in Appendix file flight2_example_jsp.txt uses multiple instances of CCGs of Airplane.java class).

J. Accessing Services of Predefined Utility Components

The Application may comprise one or more global application components, whose integration interfaces are predefined at the early stages of the design of the application. These components are normally static, that is they are not created by the CCGs dynamically by using runtime data. The predefined interfaces may include the object names, function names and communication interfaces of the functions to use their services. Usually, the global application component provides generic or common services such as status bar for showing operation progress and information box for displaying help information. Any application component in the application could use their services.

Many GUI applications such as Microsoft's Internet Explorer comprise "Status Bar" that displays status and other information such as URL if mouse moves onto a hypertext link. Other examples of utility components include popup windows to display warning or error messages, for example, if user enters wrong information such as phone number instead of name in a text box designated to enter his name, or vice versa.

An application component can be designed to use the services of utility components if the names and interfaces of the utility components are defined and documented in advance. A CCG may use predefined names and known interfaces of the utility components to build its own component so that the component communicates or requests the services of the utility components. Airplane comprises the code for getting the service of Info-table. One example is found in Appendix file flight_example_jsp.txt, where CCG for airplane component calls service method "flight_info_table.Display_info" of Info-table whose static component code is in include file info_table.jsp (in Appendix file info_table_jsp.txt)

K. Data Validation for Component Interface

Applications often need to be updated when business needs change. To accommodate newer functions, one or more large components need to be updated or replaced. The application code is generated by CCG, the CCG needs to be redesigned or replaced. When a CCG is updated or replaced, proper care must be taken to maintain its component's data interfaces with other components. Sometimes, addition of new features may require that the communication interface of the component be modified. This modification will require that other application components that communicate with this component must be updated or modified to continue to be compatible with the component.

A tool is used to detect the mismatch of the data interface (e.g., number of parameters, type of each parameter and its data format) between two components after one of the components is updated or redesigned. It is preferred that the receiving component may request a tool for validating data format before it uses the data. To validate the data, the recipient component may use a data schema or format that it is designed to accommodate for such validations. To allow for certain degree of changes, the data format used in the data interface may also be extensible so that the component can adapt the changes in the data interface.

When a data exchange is performed through a XML string, it is preferable to use an XML schema to validate the format of the XML data in the string. The service component can pass the XML string and the XML Schema to a validation tool. In the service-providing component, an XML schema is defined for the variable names, known as "XML tags", and data fields required by the service. The data sting, which comes from a requesting component, is validated against the XML schema.

The validation tool may be a generic tool that verifies the compatibility of the XML data strings used by two interacting components. Each component may maintain a private copy of the XML schema. The requesting component can create an XML data in conformity with its private copy. The recipient component can validate the XML data against its private copy. Each component can update the private XML schema when the format of the XML data is updated or changed.

If the XML data contains a URL pointing to the private copy of the sender's XML schema, the receiving component of the XML data can also verify the XML schema of the sender against the private copy of its XML schema.

The requesting component may send a request containing an XML data to a service-providing component to get a service. Before the request is processed, the service-providing component calls the validation tool, which compares the XML data/XML-schemas of the requesting component with the XML-schema of the service-providing component. If they are not compatible, it should generate an error message indicating incompatibility and list of errors. This helps detect some of the data mismatch errors arising from modification or replacement of components, for example in a maintenance update of the application.

The XML schema may define required data items and optional data items in the XML stream. Hence, omission of optional data items is not an error. To accommodate newer functionality, the XML schema of the service-providing component may be updated. If optional data is added to a newer version of the XML schema, the service-providing component may continue to provide the service requests in conformity with the old version of the XML schema. If the recipient component detects a missing optional data item but can still process the data, it may continue providing service together with a warning message.

Likewise, the requesting component may receive an XML data string that is returned from the service-providing component. It may also validate the XML data to detect a broken link or potential data format incompatibility.

To optimize the performance of the application, this validation may be turned on only when the application is run in testing mode. The validation-tool may comprise of a flag, and supports a mechanism to turn on-or-off the validation flag. If the flag is turned-off, it immediately returns without performing any validation.

Additional mechanisms are used to validate the compatibility of interfaces. The first parameter of the function may be reserved for the validation purpose. This variable may contain the version number of the interface, and accordingly the callback in the Listing 11 may be changed as follows:

1. var service_ref=services_register_obj. find_service ("ShoppingCart");
2. service_ref (version, xml_data, items_callback);

At line 2 shopping item's component calls the shopping cart component's method to get service. The item component passes the interface version to request the service. The service method compares the item's interface version with shopping cart's interface version. If the two interface versions are not equal, the components are not compatible to properly process the request.

For the schema to work both interacting components are designed to predefined version of the interface. This validation catches if one of the interacting components is inadvertently not updated, when a component that provides the service is updated. The caller of the service method passes its interface version. The service provider compares with its interface version to validate the interface compatibility.

Alternatively, the first parameter may be an object, which comprises the number of parameters, and an array where each item in the array may comprise information such as type and version about each parameter of the function.

IV. Two Implementation Examples

A. Shopping Cart Application

The shopping cart application has two kinds of components (FIG. 15): one component 1510 for maintaining a list of the items selected by a customer and components 1500 for showing a list of the items available for sales.

The list-maintaining component is an Invoice-table 1510. It comprises one service method for adding an item to the invoice table. There are plural components 1500, one for each of sale items. All item components have a service method for setting a callback for the component. If user selects an item to purchase by double-clicking on the icon or link of the item 1505, its component calls the callback, which passes the data about the item in one of the parameters to the Invoice-table. This data may be passed in an object or an XML string. The format of the object or XML string is predefined by the Shopping-cart. This data may comprise item number or barcode, model, make, price, discounts and inventory.

The CCG for an application component can be designed to hide the most of the detailed code. The application component comprises one or more subcomponents. For example, if the item is a car, it may display a subcomponent for showing detailed information about the car as a response to a user action such as a mouse click. Upon a click, the component may display another subcomponent, which shows a form (also as GUI components) with check boxes correspondent to some options (transmission type, Stereo type and CD players) and a drop-down list for selection of the color.

By proper design implementation, the CCG may use information such as user profile, screen setup preference, business policy, mathematical algorithms for predicting seasonal change, historical trends, and supply-and-demand condition, and different security restrictions. The CCG can incorporate such information in building the application code of the component.

The CCG for the Invoice-table may be designed to be independent from other components. The CCG can generate the custom application component. The code block for each of the application components can be copied into the web document and communication code is added to the application code (FIG. 12) so that the callback function of each of the Item components is able to call the Shopping-cart's service method.

The communication code in the application is generated by server integration code, or, indirectly, by directory-services method. If the components use directory services (FIG. 14), the CCG may get the lookup name of the service as one of the inputs as shown in the following pseudo-code. The CCG uses the name to include lookup statement in the component's code to get the reference for the Shopping cart's service method and to call the service method. Likewise, The ShoppingCart CCG includes in its component necessary instructions for registering its service using the given unique service name.

Relevant Sample Pseudo Code for Directory Services

1. <svg height="750" width="500">
2. <g transform="translate(450,10)">
3. <%
4. AgileTemplate Invoice=new ShoppingCart(ACI, "ShoppingCart1");
5. Invoice.CGM(out);
6. %>
7. </g>
8. <g transform="translate(10, 10)">
9. <%
10. AgileTemplate Item=new ShoppingItemCar(ACI, Model, "ShoppingCart1");
11. Item.CGM(out);
12. %>
13. </g>
14. </svg>

Line 2 determines the X and Y locations. In line 5, it uses CCG to generate application component. Line 10 instantiates and initializes the CCG and call the CGM to generate the application component code. Likewise, many shopping items may be included in the web page.

The following pseudo-code shows how server integration code generates communication code for the client.

1. <svg height="750" width="500">
2. <g transform="translate(450,10)">
3. <%
4. ShoppingCart Invoice=new ShoppingCart(ACI);
5. Invoice.CGM(out);
6. %>
7. </g>
8. <script><![CDATA[
9. function add_item_to_the_invoice (barcode, Item_obj, xml_data) {
10. <%=Invoive.getAddItemMethod( )%> (barcode, Item_ obj, xml_data);
11. }
12.]]></script>
13. <g transform="translate(10, 10)">
14. <%
15. ShoppingItemCar Item1=new ShoppingItemCar(ACI, Model);
16. Item1.addUpOnBuyCallback("add_item_to_the_invoice");
17. Item1.CGM(out);
18. %>
19. </g>
20. </svg>

Line 4 instantiates and initializes the CCG, and line 5 calls the method to generate the application component. Lines 8-12 include a callback method "add_item_to_the_invoice" in the code for the web application. Line 10 (a) Calls CCG's method, Involve.getAddItemMethod( ) to get the name of Invoice's service method to add an Item and (b) generates a line of code to call the Invoice's service method. For example, if Invoice-CCG's special service method, Involve.getAddItemMethod( ) returns "invoice_UNQID.add_shopping_item", then the lines 9-11 includes the following function definition in the application code:

1. function add_item_to_the_invoice (barcode, Item_obj, xml_data) {
2. invoice_UNQID.add_shopping_item (barcode, Item_obj, xml_data);
3. }

Line 15 instantiates and initializes CCG to generate the application component code for an Item's component. Line 16 sets the callback function "add_item_to_the_invoice", which will be called in client when the buyer selects the item to buy. Line 17 calls the CGM to generate the application component code.

The application component for each of the shopping items is allowed to communicate with the Invoice component. If the application needs to display multiple shopping-items in the web page, the lines 15-17 can be repeated for each of the shopping items. The same callback function "add_item_to_the_invoice" can be register for each of the components for the items in the application. Each shopping component passes data about its item in the function parameters. This function in turn calls service method, invoice_UNQID.add_shopping_item, to add the item to the invoice table.

B. An Air Traffic Control System

Figure 17:
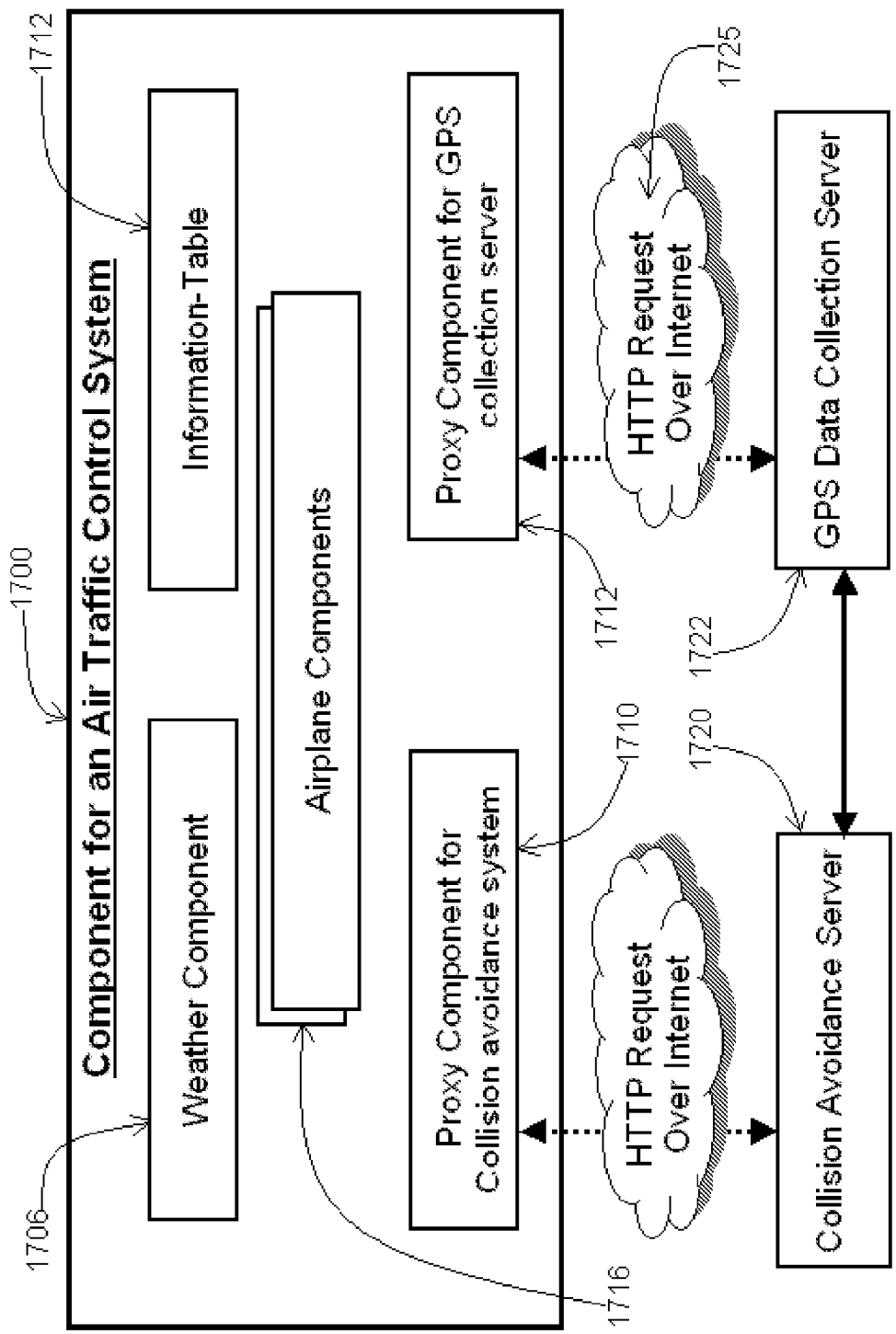
FIG. 17 shows the basic components for an air traffic control system, according to one embodiment.

The air traffic control system (FIG. 17) may comprise the following components:

1. An information-displaying table: A static utility component is used to displaying an information table 1712. It exports a service method or JavaScript function, which can be called with an XML String; and it displays the data of the XML String in a table format. This component registers its service in the services directory, and any other component can use this service. An example of Component code for a Flight Information table is shown in info_table.jsp in Appendix file info_table_jsp.txt 2. Flight components: One or more airplane or flight components 1716 are used to show the Airplanes in the air space. Each component uses an XML string to store the information about the flight. The component also has service method for getting information about the flight and service method for setting/changing colors, location, size and shape for the image of the flight and indicating the status of the flight. This component may call the JavaScript function in the information table component to display the information about the flight when mouse clicks on the image of the flight.

3. GPS data-collecting component: This component 1722, which is run background, receives data from the Global Positioning Systems ("GPS") installed on each of the flights. This program is running on a server, which is in a traffic control center. The client computer may be located in any city as long as it can be connected to the server by network connection. A small JavaScript proxy component 1712 may be included in the SVG file, which contacts the server component 1722 at regular intervals to get latest location information of all the flights. It then calls the component for each flight to inform the location of the flight. This component can convert the GPS coordinates of each flight into X, Y and Z distances in kilometer with respect to a reference point on the earth.

4. Collision avoidance system: This system is also run background on a server 1720. The algorithms for the collision avoidance system might be complex and speed is critical. So, it is not advisable to implement this as application component in the client application or SVG file. A small proxy component 1710 could be included in the SVG file, which gets the information from the server frequently. For each flight, the server finds all the flights, which are within certain distance of, or approaching the flight at a critical speed. If such situation arises, the system sends an alarm to the proxy component 1710, which raises alarm, and sends a message to the components of all of the involved flights 1716 so that the flight components could set colors to indicate the danger. If different air traffic controllers guide different flights, this system may provide suggestions to the controllers so that they could guide the involved flights away from the collision courses.

5. A weather component 1706 for displaying weather conditions in the background of the screen: This SVG component fetches the up-to-date weather information from a server using XML data and displays the weather conditions (FIG. 18) in a background view for various regions of the air-traffic monitoring area. Thus, the map looks like the weather broadcast maps commonly seen on TV. The weather component can update the weather conditions at specified time intervals using the external local source. When a user moves mouse over a flight image, the flight component gets wind speed and visibility information from the weather component and draws a circle around the flight to show the visibility. Additional information such as numeric value of visibility may be indicated in the vicinity of the flight image. The weather information may, optionally, be stored in the XML data for each flight. In this case, the portion of the data fields for weather information should be updated periodically.

The component for each of the flight 1716 may be custom-generated by a CCG object. The component consists of XML data, SVG code for displaying the image and JavaScript code. This collision avoidance system could be replaced with appropriate business specific systems for other location-based applications. A transportation or shipping company may track its trucks using GPS; and the shipping company may use its business specific system to determine which truck is closest to the location where a customer has a package for delivery; and a taxi company may use its business specific system to identify a nearest taxi cab for a prospective passenger.

The GUI class for Airplane.java can be used for building Air Traffic monitoring applications. An example of Java Server Page (or JSP) program for an Air traffic monitoring system is shown in flight2_example.jsp in Appendix file flight2_example_jsp.txt. An example of CCG class for a limited or partially functional Air traffic monitoring system is shown in ATC_CF.java in Appendix file ATC_CF_java.txt. An example of JSP program that uses ATC_CF.java class to present Air traffic monitoring system for three cities is shown in atc_example.jsp in Appendix file atc_example_jsp.txt.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A process to generate component code of a container component on a server computer for rendering on a client computer connected to the server computer, the server computer running a container component code-generator which uses a first component code generator for a first subcomponent and a second component code generator for a second subcomponent, each of the component code generators being implemented with a code-generating method for generating the component code of corresponding subcomponent, the process comprising the steps of:

using the first component code generator to generate the component code of the first subcomponent and including the component code of the first subcomponent in container component code;

using the second component code generator to generate the component code of the second subcomponent and including the component code of the second subcomponent in the container component code; and generating communication code that allows the first subcomponent and the second subcomponent to communicate on the client computer and including the communication code in the container component code.

2. The process of claim 1 wherein at least one of the component code generators is implemented with a service method for getting the name of a service method of the corresponding subcomponent, and wherein the communication code in the component code of the container component includes a call to the service method.

3. The process of claim 2 wherein at least one of the first and second component code generators for subcomponents is implemented in class definition and server's program for generating the container component that contains code for instantiating and initializing an object for the corresponding subcomponent on the server computer by using a constructor or set-method implemented in the class definition of the component code generator.

4. The process of claim 2 further comprising the steps that at least one of the component code generators accesses data from a database or other resources by executing the code of application logic inside the component code generator in the process of building its corresponding subcomponent.

5. The process of claim 2 further comprising the steps that at least one of the component code generators for subcomponent modifies at least one of variable or method names used in the corresponding subcomponent so as to avoid any name conflict in the component code.

6. The process of claim 1 wherein at least one of the component code generators is implemented in class definition and the container component code generator contains code for instantiating and initializing an object instance of the class definition for generating the corresponding subcomponent at server run time by calling a constructor or set-method included in the component code generator.

7. The process of claim 6 further comprising the steps that at least one of the component code generators accesses data from a database or other resources by executing the code of application logic inside the component code generator in the process of building its corresponding subcomponent.

8. The process of claim 6 further comprising the steps that at least one of the component code generators modifies at least one of variable or method names used in the corresponding subcomponent so as to avoid variable name conflict with another variable or method name in the code of the container component or the other subcomponent.

9. The process of claim 1 further comprising the steps that at least one of the component code generators accesses data from a database or other resources by executing the code of application logic inside the component code generator in the process of building its corresponding subcomponent.

10. The process of claim 1 further comprising the steps that at least one of the component code generators modifies at least one of the variable or method names used in the corresponding subcomponent so as to avoid variable name conflict with another variable or method name in the code of the container component or other subcomponent.

11. A process of a server computer to generate component code of a container component for rendering at a client computer connected to the server computer, the server computer running a container component code generator which uses a component code generator for generating the component code of a subcomponent, the component code generator implementing a code-generating method for generating the component code, the component code from the container component code generator containing a function that is not generated by the component code generator, the process comprising the steps of:

using the component code generator to generate the component code of the subcomponent and including the component code of the subcomponent in the component code; and generating communication code that allows the subcomponent to call a function in the component code at the client computer.

12. The process of claim 11, further comprising the steps that component code generator accesses data from a database or other resources by running code of application logic inside the component code generator in the process of building the subcomponent.

13. The process of claim 12, further comprising the step of initializing the component code generator on the server computer by using a constructor or a set-method implemented in the component code generator.

14. The process of claim 11 further comprising the step of initializing the component code generator at run time by using a constructor or a set-method implemented in the component code generator.

15. A process of a server computer to generate component code of a container component for rendering at a client computer connected to the server computer, the server computer running a container component code generator using a component code generator for generating the component code of a subcomponent, the component code of the subcomponent generated by the component code generator containing a service method, the component code generator being implemented with a service method for getting the name of a service method of the subcomponent, the process comprising the steps of:

using the component code generator to generate the component code of the subcomponent and including the component code of the subcomponent in the component code;

using the service method of the component code generator to get the name of the service method of the subcomponent; and generating communication code that allows the container component code that is not generated by the component code generator to call the service method of the subcomponent.

16. The process of claim 15, further comprising the step of initializing the component code generator on the server computer by using a constructor or a set-method implemented in the component code generator.

17. The process of claim 15, further comprising the step of accessing data from a database or other resources by running the code of application logic inside the component code generator in the process of building the subcomponent.

18. A method of developing a web application on any computer for a system comprising a server and a connected client computer, the method comprising the steps of:

coding a first component code generator that is able to generate component code as a first subcomponent upon its execution on the server;

coding a second component code generator that is able to generate component code as a second subcomponent upon its execution on the server;

coding server code for inputting or instantiating the first component code generator on the server;

coding code that uses the first component code generator to generate the component code of the first subcomponent on the server;

coding server code for inputting or instantiating the second component code generator on the server;

coding server code for using the second component code generator to generate the component code of the second subcomponent on the server;

coding necessary server integration code for generating communication code that allows the first subcomponent and the second subcomponent to communicate on the client computer; and coding remaining necessary server integration code of the container component, whereby, upon execution of the coded server program on the server, generates a web application containing a container component and two included subcomponents where the first subcomponent and the second subcomponent can communicate on the client computer.

19. The method of claim 18, wherein the server integration code includes code for calling a service method for getting the name of the service method of the first subcomponent and includes code for using the name of the service method in generating the component code of the second subcomponent so that the second subcomponent is able to communicate with the first subcomponent at the client computer.

20. The method of claim 19, wherein at least one of the component code generators is coded in class definition with a constructor or a set-method for instantiating and initializing an object for the component code generator on the server.

21. The method of claim 19, wherein at least one of the component code generators or the container component code generator contains code for accessing data from database or other resources in the process of building the corresponding subcomponent or the container component.

22. The method of claim 19, wherein each of the component code generators has code for modifying at least one of variable or method names used in each of the subcomponents so as to avoid any name conflict in the component code.

23. The method of claim 18, wherein at least one of the component code generators is coded in class definition with a constructor or a set-method for instantiating and initializing an object for the component code generator at server run time.

24. The method of claim 23 wherein at least one of the component code generators or the container component code generator contains code for accessing data from a database or other resources in the process of building the corresponding subcomponent or the container component.

25. The method of claim 18, wherein at least one of the component code generators or the container component code generator contains code for accessing data from database or other resources in the process of building the corresponding subcomponent or the container component.

26. The method of claim 18, wherein each of the component code generators has code for modifying at least one of variable or method names used in each of the subcomponents so as to avoid any name conflict in the component code.

27. The method of claim 18, wherein at least one of the two component code generators is a pre-built component code generator.

28. A method of developing a web application on any computer for use on a system comprising a server computer and a connected client computer, the method comprising the steps of:
coding a component code generator that is able to generate component code as a subcomponent upon its execution on the server computer;
coding server code for inputting or instantiating the component code generator on the server computer in a container component code generator for generating code for a container component;
coding server code for generating a function inside the container component for execution on the client computer; and
coding server integration code for inputting the name of a function into the component code generator for generating the component code comprising communication code on the server computer,
whereby, upon the execution of resultant server program, the server computer sends the web application, containing the container component and subcomponent, to the client computer where the subcomponent is capable of calling the function in the container component.

29. The method of claim 28, wherein the component code generators are implemented in a class and contains code for instantiating and initializing an object for the component code generator on the server computer by using a constructor or a set-method implemented in the component code generator.

30. The method of claim 29 wherein the component code generator or the container component code generator contains code for accessing data from a database or other resources.

31. A method of developing web component code on any computer for use in a system comprising a server computer and a connected client computer, the method comprising the steps of:
coding a component code generator that is able to generate component code as a subcomponent upon its execution on the server computer;
coding server code for inputting or instantiating the component code generator on the server computer;
coding server code for calling the component code generator to generate the component code of the subcomponent on the server computer;
coding server code for getting the name of a service method of the subcomponent on the server computer; and
coding server integration code for generating communication code in the component code,
whereby, upon execution of resultant server program on the server computer, the server computer sends the web application containing container component and the subcomponent to the client computer where the container component is able to call the service method of the subcomponent.

32. The method of claim 31, wherein the component code generator is implemented in class definition which contains a constructor or a set-method for instantiating and initializing an object for the component code generator.

33. The method of claim 32, wherein the component code generator or the container component code generator contains code for accessing data from a database or other resources in the process of building the subcomponent or the container component.

34. A process of a server computer to generate the component code of a container component for rendering at a client computer connected to the server computer, the process comprising the steps of:
using a first component code generator to generate the component code of a first subcomponent on the server and including the component code of the first subcomponent in the component code;
using the second component code generator to generate the component code of a second subcomponent on the server and including the component code of a second subcomponent in the component code;
generating registration code in the first subcomponent or the container component on the server computer, the registration code using a lookup key to register a reference to a service method or an object of the first component with the registration object on the client computer; and
generating retrieving code in the second subcomponent on the server computer, the code using the lookup key to get the reference to the service method or the object of the first subcomponent or the container component so that the second subcomponent is able to communicate with the first subcomponent or the container component on the client computer.

35. The process of claim 34, wherein the lookup key is a string or a number.

36. The process of claim 35 wherein the steps that at least one of the component code generators accesses data from database or other resources by executing the code of application logic inside the component code generator in the process of building its correspondent subcomponent.

37. The process of claim 34 wherein the steps that at least one of the component code generators accesses data from database or other resources by executing the code of application logic inside the component code generator in the process of building its correspondent subcomponent.

38. The process of claim 34 wherein the steps that at least one of the component code generators modifies at least one of the variable or method names used in the correspondent subcomponent so as to avoid a variable name conflict in the component code.

* * * * *